US011948582B2

(12) United States Patent
Stafylakis et al.

(10) Patent No.: US 11,948,582 B2
(45) Date of Patent: Apr. 2, 2024

(54) SYSTEMS AND METHODS FOR SPEAKER VERIFICATION

(71) Applicant: Omilia Natural Language Solutions Ltd., Limassol (CY)

(72) Inventors: Themos Stafylakis, Athens (GR); Petr Mizera, Rovensko pod Troskami (CZ); Dimitris Vassos, Limassol (CY)

(73) Assignee: OMILIA NATURAL LANGUAGE SOLUTIONS LTD., Limassol (CY)

( * ) Notice: Subject to any disclaimer, the term of this patent is extended or adjusted under 35 U.S.C. 154(b) by 559 days.

(21) Appl. No.: 16/363,658

(22) Filed: Mar. 25, 2019

(65) Prior Publication Data

US 2020/0312337 A1    Oct. 1, 2020

(51) Int. Cl.
*G10L 17/24*    (2013.01)
*G10L 15/08*    (2006.01)
(Continued)

(52) U.S. Cl.
CPC .............. *G10L 17/24* (2013.01); *G10L 15/08* (2013.01); *G10L 15/22* (2013.01); *G10L 17/00* (2013.01);
(Continued)

(58) Field of Classification Search
CPC ......... G06F 21/32; G10L 15/08; G10L 15/22; G10L 2015/088; G10L 2015/223; G10L 17/00; G10L 17/14; G10L 17/24
See application file for complete search history.

(56) References Cited

U.S. PATENT DOCUMENTS 5,414,755 A    5/1995   Bahler et al.
6,421,453 B1*  7/2002   Kanevsky ............. G06F 21/316
                                                         340/5.2
(Continued)

FOREIGN PATENT DOCUMENTS

EP    1507394 A2    2/2005
EP    3543874 A1    9/2019
(Continued)

OTHER PUBLICATIONS

Nicolaou, C. et al., "Where Is My Parcel? Fast and Efficient Classifiers to Detect User Intent in Natural Language," 2019 6th Intl. Conf. on Social Networks Analysis, Management and Security (SNAMS), IEEE, pp. 351-356.
(Continued)

*Primary Examiner* — Daniel C Washburn
*Assistant Examiner* — Oluwadamilola M Ogunbiyi
(74) *Attorney, Agent, or Firm* — White & Case LLP

(57) ABSTRACT

A system includes an interactive voice recognition (IVR) module arranged to perform a speech conversation with a first user and receive a first user identifier, where the speech conversation has an interaction context based on a subject matter of the speech conversation. The system includes a datastore arranged to store a group of active words associated with the interaction context and store first user voiceprints derived from pre-captured audio of the first user, where each active word is selected based on one or more selection criterion derived from conversations of a population of users. An automated speech recognition (ASR) module is arranged to perform speech recognition of the first user audio provided during the speech conversation. A voice biometric (VB) module is arranged to generate captured voiceprints and determine a similarity score based on comparisons of captured voiceprints with first user voiceprints.

20 Claims, 10 Drawing Sheets

(51) Int. Cl.
*G10L 15/22* (2006.01)
*G10L 17/00* (2013.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 6,615,194 B1* | 9/2003 | Deutsch | G06Q 20/20 235/487 |
| 8,942,986 B2 | 1/2015 | Cheyer et al. | |
| 9,148,512 B1* | 9/2015 | Kumar | H04M 3/5166 |
| 10,339,452 B2 | 7/2019 | Romano et al. | |
| 10,679,134 B2 | 6/2020 | Romano et al. | |
| 2002/0002465 A1* | 1/2002 | Maes | G10L 15/065 704/275 |
| 2005/0105712 A1 | 5/2005 | Williams et al. | |
| 2010/0131900 A1* | 5/2010 | Spetalnick | G06F 40/274 715/825 |
| 2011/0238408 A1 | 9/2011 | Larcheveque et al. | |
| 2012/0253809 A1* | 10/2012 | Thomas | G10L 17/24 704/E15.001 |
| 2013/0110520 A1 | 5/2013 | Cheyer et al. | |
| 2013/0132091 A1 | 5/2013 | Skerpac | |
| 2013/0238317 A1* | 9/2013 | You | G10L 15/1815 704/9 |
| 2014/0025705 A1 | 1/2014 | Barve et al. | |
| 2014/0172430 A1* | 6/2014 | Rutherford | G06Q 20/32 704/273 |
| 2014/0222419 A1 | 8/2014 | Romano et al. | |
| 2014/0372128 A1* | 12/2014 | Sheets | G06Q 20/20 704/273 |
| 2015/0269945 A1* | 9/2015 | Taylor | G10L 17/24 704/246 |
| 2016/0372116 A1 | 12/2016 | Summerfield | |
| 2017/0075935 A1 | 3/2017 | Lagos et al. | |
| 2017/0148445 A1* | 5/2017 | Gorthi | H04M 1/27453 |
| 2017/0236520 A1* | 8/2017 | Borgstrom | G10L 17/04 704/239 |
| 2017/0301353 A1* | 10/2017 | Mozer | G10L 17/02 |
| 2017/0358317 A1* | 12/2017 | James | G10L 15/30 |
| 2018/0018973 A1* | 1/2018 | Moreno | G10L 17/14 |
| 2018/0040325 A1* | 2/2018 | Melanson | G10L 17/00 |
| 2018/0063062 A1* | 3/2018 | Burdakov | H04L 51/226 |
| 2018/0082689 A1* | 3/2018 | Khoury | H04M 1/271 |
| 2018/0108001 A1* | 4/2018 | Taylor | G06Q 20/12 |
| 2018/0151182 A1* | 5/2018 | Wyss | G10L 17/06 |
| 2018/0240463 A1* | 8/2018 | Perotti | G10L 17/22 |
| 2018/0279063 A1* | 9/2018 | Sun | H04S 7/302 |
| 2018/0285752 A1* | 10/2018 | Yu | G06V 40/20 |
| 2018/0315429 A1* | 11/2018 | Taple | G10L 17/24 |
| 2018/0342237 A1* | 11/2018 | Lee | G10L 15/26 |
| 2019/0026760 A1 | 1/2019 | Hwang et al. | |
| 2019/0251417 A1 | 8/2019 | Bennett et al. | |
| 2019/0251960 A1* | 8/2019 | Maker | G10L 21/0232 |
| 2019/0279647 A1* | 9/2019 | Jones | G10L 17/26 |
| 2019/0295535 A1 | 9/2019 | Sapugay et al. | |
| 2019/0325324 A1 | 10/2019 | Romano et al. | |
| 2019/0362057 A1* | 11/2019 | Keret | G06F 21/32 |
| 2019/0370396 A1 | 12/2019 | Agnihotram et al. | |
| 2019/0385615 A1* | 12/2019 | Sharifi | G10L 17/00 |
| 2019/0386917 A1 | 12/2019 | Malin | |
| 2020/0019688 A1* | 1/2020 | Jhawar | G02B 27/017 |
| 2020/0066255 A1 | 2/2020 | Madan et al. | |
| 2020/0152206 A1* | 5/2020 | Shen | G10L 17/10 |
| 2020/0184979 A1* | 6/2020 | Keret | G10L 17/00 |
| 2020/0411013 A1* | 12/2020 | Horton | H04M 3/2281 |
| 2021/0125619 A1* | 4/2021 | Lopez Espejo | G06F 21/32 |

FOREIGN PATENT DOCUMENTS

| | | | | |
|---|---|---|---|---|
| JP | 01103759 A | * | 10/1987 | |
| TW | M550889 U | * | 10/2017 | G06T 16/683 |
| WO | WO-2007051109 A2 | | 5/2007 | |
| WO | WO-2011119171 A2 | | 9/2011 | |
| WO | WO-2017059679 A1 | * | 4/2017 | |
| WO | WO-2018108080 A1 | * | 6/2018 | G06F 16/683 |
| WO | WO-2019013316 A1 | * | 1/2019 | F24F 11/46 |

OTHER PUBLICATIONS

Papalkar, S. et al., "A Review of Dialogue Intent Identification Methods for Closed Domain Conversational Agents," IEEE, 2018, pp. 566-570.

Pappu, A. et al., "Method and System for Providing Semi-Supervised User Intent Detection for Multi-Domain Dialogues," IP.com Prior Art Database Technical Disclosure, Yahoo! 2017, 6 pages.

Qu, C. et al., "User Intent Prediction in Information-Seeking Conversations," CHHR '19 Mar. 10-14, 2019, Glasgow Scotland, ACM, 9 pages.

Zhang, H. et al., "Generic Intent Representation in Web Search," 2019, ACM, 10 pages.

Zhong, J. et al., "Predicting Customer Call Intent by Analyzing Phone Call Transcripts Based on CNN for Multi-Class Classification," Marchex, Inc., 2019, pp. 09-20.

* cited by examiner

SYSTEMS AND METHODS FOR SPEAKER VERIFICATION

FIELD

The present application relates to systems, devices, apparatuses and methods of using voice biometrics. More particularly, the application relates to voice biometrics applied to live natural speech and employing context aware models to verify users.

BACKGROUND

Computing systems, as well as, devices, apparatuses and services often have a controlled access mechanism for regulating user access to their resources and data. These mechanisms may be implemented in hardware or software or a combination of the two. The most commonly used controlled access mechanism is the use of credentials, often in the form of a username and password duet. Depending on the chosen level of security, more complex mechanisms may be employed where the user must be in possession of a physical token (e.g. token generation device for e-banking code entry), key, or card (e.g. a bank card for use at Automated Teller Machine (ATMs), etc.

More recently, biometric methods have been tested and employed in Voice Biometric (VB) systems, in fingerprint reading, iris scanning, voice identification, face identification, etc. Their adoption and performance have various degrees of success. Some issues related to their success is the varying level of correct user identification as a result of environmental conditions (e.g. poor lighting, noise, multiple concurrent speakers), robustness to users pretending to be someone else or using duplicates of the real user's characteristics to fool the identification/verification system (e.g. playback of the target user's voice, showing a photo of the target user's face or fingerprint), simplicity of use, and necessity for special User Interface (UI) hardware.

For simplicity reasons and for avoidance of requiring special user devices, voice based user verification has been gaining acceptance as either a standalone verification mechanism or in combination with other mechanisms. Existing systems often perform either speech recognition or voice recognition, but not both processes at the same time. Speech recognition identifies particular words that are spoken, while voice recognition identifies the user or speaker that is speaking.

In particular, voice biometrics (i.e. processing of certain voice characteristics) are used to compare a user's voice characteristics against stored voice characteristics of the same and other users. This mechanism can operate as "user identification" where the system identifies a user based on his voice, without previously knowing who the user is or without the user claiming and identity, and as "user verification" where the claimed or estimated identity of the user is known and the system verifies that the claimed or estimated identity is correct or not.

Several methods and systems exist for voice biometrics for speaker verification and/or identification. They frequently use special text or phrases that the user dictates during an enrolment phase. Alternatively there are examples of conversational scenarios where the users should say a password and (upon correct identification of the said password) they are then asked to provide an answer to a challenge question from a set of questions previously stored by the system and which may relate to the specific user.

Other variations exist, where the user is asked to answer questions, or speak out identification codes for transactions with or without passwords, or simply read aloud a text supplied by the system, known as text-prompted speaker verification, etc.

Some of these systems maintain voiceprint databases and when the speaker utters any phrase in any of the above scenarios, a "live" voiceprint, or more than one, are created and compared against the corresponding voiceprints stored in the database. Following correct verification (and in some cases identification) of the user from his voiceprint, an action is taken by the system, usually granting access to the said user to a system or service.

Variations of the voiceprint matching mechanisms include adaptation of relevant thresholds, statistical processing, and use of multistage matching with an initial match providing a group of potential users from those whose data are stored in the database, and subsequent stage(s) refining the matching to get the most probable match.

In some of the found references, the inventors use Automatic Speech Recognition (ASR) and Natural Language Understanding (NLU) modules. An NLU module is used to understand what the user says by identifying words in the user's speech, which words correspond to passwords etc. or answers to system's question, which the user has to provide and the system has to capture from the user's speech and compare them against the corresponding data stored in the user's records in one or more databases. In other words, this is a simple example of a user uttering a credential such as a PIN number ("does the spoken password match the stored password"?).

Similar scenarios exist, where the user is asked to speak a word or text selected by the system and which was also used at an enrolment step, meaning that the user has to undergo a tedious and often annoying enrolment process, where they are asked to utter words and more often entire phrases upon which their voice identity will be scored, necessitating of course the repetition of the enrolled words or phrases each time they need to be identified or verified by the system.

Current voice biometric verification methods and systems have drawbacks, as previously explained, which hinder their accuracy and adoption. All the above methods also introduce significant delays until a user is recognized by their voice as they either have to go through a tedious question and answer dialogue with the system. More recent text-independent speaker recognition approaches have "shrunk" such dialogues, while the latest approaches may under certain limitations and conditions identify a user only by his request, avoiding in many cases (not always) the use of dialogue sessions. However, even the most advanced prior art does require long segments of user speech to accurately verify the user, in the order of a few seconds. Again this is not realistic on most real usage scenarios, where the user spoken request may be extremely short.

Accordingly, there is a need for innovative methods and systems for user identification and/or verification using voice biometrics that are simple to use, fast enough for real-time operation, do not need specialized hardware, and produce accurate results with minimal or, ideally, no conscious user involvement in enrollment and training steps. Such innovation should also not alter the usual user routine when verbally interacting with a system and be able to operate under little or no restrictions regarding the available user speech.

SUMMARY

An innovative solution is presented for speaker verification using voice biometrics on live natural speech or dialogues of arbitrary duration and content. The proposed speaker biometric verification is based on the notion of Active Words (AW) where the speaker's live speech is analyzed and compared against stored voiceprints. To facilitate the verification process in the presence of very short voice segments, the present innovative solution analyzes the uttered speech to identify words, classified as "active words", that is, words that are frequently used under a specific context (e.g. a financial transaction). Using these Active Words the present solution searches for and compares them with stored active word voiceprints for the same speaker, previously derived during past interactions of the user with the system, and created from a similar model from the previous interactions of sets of users with the system. As a result, the use of Active Words solves the problem encountered in voice biometrics where very short speech segments are not enough to provide an accurate user identification and where the user's interaction routine with the system has to be changed.

In an exemplary aspect of the proposed innovative solution, a speaker initiates a communication session with the VB system, which transcribes the speaker's voice to text and identifies uttered words.

The system captures and uses session related data to pre-identify the user and then limit the amount of calculations for the similarity scores between the Active Words live voiceprints and only a subset of the archived voiceprints, which belong to the same user. As a result significant improvements are achieved in processing speed, processing capability of simultaneous user sessions in the same processing infrastructure and reduction of the minimum duration of user utterance that can be used for meaningful and accurate user identification and verification.

The system identifies the current context, where the content and/or context is derived from transcribed speech analysis and/or identification data relating to the specific system application and user session. Transcribed words are analyzed to select frequently used words (AW) and to produce a speaker live voiceprint for the AW and compared to one or more stored voiceprints for the same AW of the same speaker.

The stored voiceprint(s) has been constructed during enrolment and may have been updated during previous user sessions. The stored voiceprint(s) may be stored in a compact way by exploiting correlations inside the voiceprint and with AW models representing average representations of uttered active words (and other words) of a set of system speakers-users. The system then creates similarity scores with the speaker's archived voiceprints for the identified active words.

In another variation of this exemplary aspect, a text-independent speaker identification or verification model is also included, which extracts one voiceprint per utterance. The similarity score provided by the text-independent model is combined with the similarity scores provided by the AW-based model using score-level fusion techniques.

The present innovative solution and all its exemplary aspects allow the speaker to speak in natural language, without the need to change his pace, complexity, intonation, or any other characteristic of his speech. They also eliminate the need (as in prior art) for the user to enroll to the system the speaker's uttering of enrolment words and phrases or repeating predefined words and phrases every time they are to be identified. Also, the present innovative solution eliminates the need to use long uttered phrases thereby avoiding altering user interaction pattern and unnecessary dialogue turns with the system to extend the user's utterances and allow the system to accurately verify them. As a result, simple, faster and more accurate voice biometric verification is achieved.

One aspect of the invention includes a system for performing speaker verification. The system includes an interactive voice recognition (IVR) module arranged to perform a speech conversation with a first user and receive a first user identifier, where the speech conversation has an interaction context based on a subject matter of the speech conversation. The system includes a datastore arranged to store a group of active words associated with the interaction context where each active word is selected based on one or moreselection criterion derived from conversations of a population of users. The datastore also stores the first user identifier and a plurality of first user voiceprints derived from pre-captured audio of the first user where each first user voiceprint corresponds to each active word of the group of active words. The system also includes an automated speech recognition (ASR) module arranged to perform speech recognition of the first user audio provided during the speech conversation, where the ASR module converts the first user audio including a plurality of captured audio elements into transcribed text including a corresponding plurality of text elements;

The system further includes a voice biometric (VB) module arranged to: i) receive the first user audio including the plurality of captured audio elements and the transcribed text including the plurality of corresponding text elements, ii) receive the first user identifier, iii) compare the plurality of corresponding text elements with each active word of the group of active words, iv) identify text elements matching each active word of the group of active words, and v) generate a captured voiceprint for each captured audio element corresponding to each text element matching each active word, vi) compare each captured voiceprint corresponding to each active word of the group of active words with each first user voiceprint corresponding to each active word of the group of active words, vii) generate a similarity score based on one or more of the comparisons of each captured voiceprint with each first user voiceprint; and viii) if the similarity score is greater than or equal to a threshold value, indicate that the first user identifier is verified or if the similarity score is less than the threshold value, indicate that the first user identifier is not verified.

In some implementations, the similarity score is based on the closest comparison of one of the captured voiceprints with one of the first user voiceprints. An audio element may include at least one of a phoneme, syllable, word, subword, or phrase. A text element may include at least one of a word, subword, and phrase. In one configuration, portions of operations of the IVR, ASR, and VB are implemented in a common module.

Speech recognition may be implemented using at least one speech recognition model including vector analyses, Hidden Markov models (HMMs), Dynamic time warping based speech recognition, a back-off model, Neural networks, Deep feedforward and recurrent neural networks, Long short-term memory (LSTM), acoustic modeling, language modeling, a Gaussian mixture model, and/or end to end automatic speech recognition. The one or more of the comparisons of each captured voiceprint with each first user voiceprint may include at least one voice recognition model selected from the group of vector analyses, Hidden Markov models (HMMs), Dynamic time warping based speech recognition, a back-off model, Neural networks, Deep feedforward and recurrent neural networks, Long short-term memory (LSTM), acoustic modeling, language modeling, a Gaussian mixture model, and end to end automatic speech recognition.

In one implementation, the one or more selection criterion for active words includes at least one selected from the group of frequency of use, type of word, amount of phonemes in a word, combination of phonemes, and amount of syllables in a word or phrase. The interaction context may include a type of interaction that the first user has with the IVR. The interaction context may include a banking application, a healthcare application, a frequent flyer rewards application, a utility provider application, a mobile service provider application, or any IVR-based application that enables users to interface with a service or product provider.

In another aspect, a server configured to perform speaker verification includes a communications interface arranged to perform a speech conversation with a first user and receive a first user identifier, where the speech conversation has an interaction context based on a subject matter of the speech conversation. The communications interface may be arranged to receive, from a datastore, a group of active words associated with the interaction context, where each active word is selected based on one or more selection criterion derived from conversations of a population of users. The communications interface may receive, from the datastore, the first user identifier and a plurality of first user voiceprints derived from pre-captured audio of the first user, where each first user voiceprint corresponds to each active word of the group of active words. The server also includes a processor arranged to perform speech recognition of the first user audio provided during the speech conversation, where the processor converts the first user audio including a plurality of captured audio elements into transcribed text including a corresponding plurality of text elements. The processor is also arranged to: i) receive the first user audio including the plurality of captured audio elements and the transcribed text including the plurality of corresponding text elements, ii) receive the first user identifier, iii) compare the plurality of corresponding text elements with each active word of the group of active words, iv) identify text elements matching each active word of the group of active words, and v) generate a captured voiceprint for each captured audio element corresponding to each text element matching each active word, vi) compare each captured voiceprint corresponding to each active word of the group of active words with each first user voiceprint corresponding to each active word of the group of active words, vii) generate a similarity score based one or more of the comparisons of each captured voiceprint with each first user voiceprint; and viii) if the similarity score is greater than or equal to a threshold value, indicate that the first user identifier is verified or if the similarity score is less than the threshold value, indicate that the first user identifier is not verified.

A further aspect includes a method for performing speaker verification including performing a speech conversation with a first user and receive a first user identifier, where the speech conversation has an interaction context based on a subject matter of the speech conversation. The method includes receiving a group of active words associated with the interaction context, where each active word is selected based on one or more selection criterion derived from conversations of a population of users and receiving the first user identifier and a plurality of first user voiceprints derived from pre-captured audio of the first user, where each first user voiceprint corresponds to each active word of the group of active words. The method further includes: performing speech recognition of the first user audio provided during the speech conversation, where a processor converts the first user audio including a plurality of captured audio elements into transcribed text including a corresponding plurality of text elements; receiving the first user audio including the plurality of captured audio elements and the transcribed text including the plurality of corresponding text elements; comparing the plurality of corresponding text elements with each active word of the group of active words; identifying text elements matching each active word of the group of active words; generating a captured voiceprint for each captured audio element corresponding to each text element matching each active word; comparing each captured voiceprint corresponding to each active word of the group of active words with each first user voiceprint corresponding to each active word of the group of active words; generating a similarity score based one or more of the comparisons of each captured voiceprint with each first user voiceprint; and if the similarity score is greater than or equal to a threshold value, indicating that the first user identifier is verified or if the similarity score is less than the threshold value, indicating that the first user identifier is not verified.

With respect to patent eligibility, the above aspects should not be considered directed to an abstract idea. Instead, the above aspects should be considered directed to an Internet-centric problem or improvement of computer technology related to more efficient voice or speaker recognition that advantageously reduces memory and processing demands on a voice biometric system. By using active words to perform voice recognition, a voice biometric system is able to more efficiently focus on a subset of user audio or speech. The system also advantageously combines speech recognition with voice recognition in a technically innovative way to enable rapid identification of the active words using speech recognition to which voice recognition then applied. While the above aspects could involve an abstract idea, the aspects are not directed to that idea standing alone. A long-standing problem with voice recognition is how to quickly, efficiently, and reliably verify the identity of speakers. The above aspects are directed to technically improving the speed, efficiency, and reliability, while reducing the cost in processing and memory of speaker recognition.

Even if additional features of the above aspects, when viewed individually, are considered generic computer and networking functions, an inventive concept exists because of the unconventional and non-generic combination of known elements, including using speech recognition to identify active words and then using voice biometrics or speaker recognition on those identified active words, which enables an efficient and reliable verification of the identity of a user. Furthermore, the various features and limitations of the above aspects should confine any abstract ideas to a particular and practical application of those abstract ideas such that the combination of features is not a well-understood, routine or conventional activity. The above comments should apply to other aspects described herein.

DETAILED DESCRIPTION

The word "exemplary" is used herein to mean "serving as an example, instance, or illustration". Any aspect, implementation, or configuration described herein as "exemplary" is not necessarily to be construed as preferred or advantageous over other aspects, implementations, or configurations.

The acronym "IVR" is intended to mean "Interactive Voice Response".

The acronym "NLU" is intended to mean "Natural Language Understanding".

The acronym "ASR" is intended to mean "Automatic Speech Recognition".

The acronym "DM" is intended to mean "Dialogue Manager".

The acronym "PSTN" is intended to mean "Public Switched Telephone Network".

The acronym "Public Land Mobile Network" is intended to mean "PLMN".

The acronym "VAD" is intended to mean "Voice Activity Detector".

The acronym "VA" is intended to mean "Voiceprint Adaptation".

The acronym "UI" is intended to mean "User Interface".

The acronym "OS" is intended to mean "Operating System".

The term "mobile device" may be used interchangeably with "client device" and "device with wireless capabilities". A mobile device may include, without limitation, a cellular telephone, a mobile handset, a personal digital assistant, a wireless tablet, a wireless computing device, and the like.

The term "user" may be used interchangeably with "regular user" and "ordinary user" and "speaker". It may also be used to mean "caller" in a telephone or VOIP call or conferencing session, "user of an application" or "user of a service", and "participant" in a text chat, audio chat, video chat, email, audio-conference or video-conference session.

The term "system" may be used interchangeably with "device", "apparatus", and "service", except where it is obvious to a reader of ordinary skill in related art that these terms refer to different things, as this is apparent by the context of the discussion in which they appear. Under any circumstance, and unless otherwise explicitly or implicitly in the description, these four terms should be considered to have the broadest meaning i.e. that of encompassing all four.

The present invention treats the problem of identifying a speaker using voice biometrics applied to natural language, free speech dialogue of the speaker with a system, device, apparatus, or service. It aims to present a solution to many speaker verification problems, comprising avoiding having the speaker to dictate predefined text extracts, repeat text prompts, alter his intonation, use simplified speech, emphasize predefined keywords, use non-verbal means of identification, or add unnecessary complexity in the identification process. It also targets the use of fully automated systems, apparatuses and devices which support natural language processing and understanding, compatibility with existing Interactive Voice Response (IVR) systems, support of natural, real-time Dialogue Manager (DM) systems, and Automatic Speech Recognition (ASR) systems.

Figure 1:
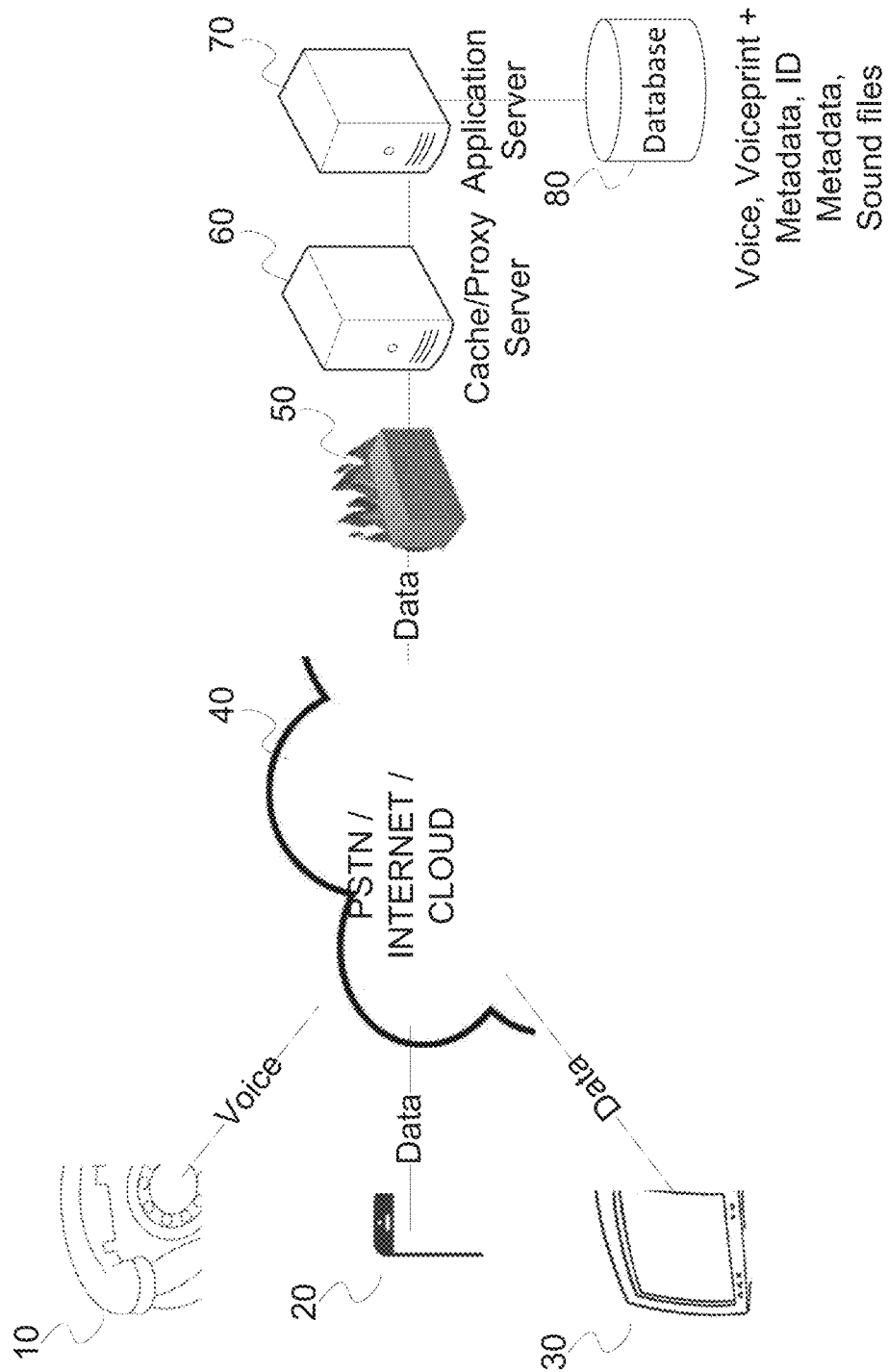
FIG. 1 shows a schematic diagram of a system implementing aspects of the present inventions.

FIG. 1 shows a schematic diagram of a system implementing aspects of the present inventions. A speaker can use the identification service via any type of device, comprising analogue telephone 10, digital telephone or mobile (cellular) telephone or smartphone 20, or computer or laptop or tablet 30 with voice capture and audio playback capabilities. Regardless of the device or apparatus of choice, the speaker's speech is converted into either a voice signal (if an analogue telephone 10 is used) or a data stream and sent to 40 a Public Switched Telephone Network (PSTN) or one of Public Land Mobile Network (PLMN), Internet, Private Network, Cloud, respectively. The voice signal is converted to data (not shown in FIG. 1) by a server and then fed to the back-end portion of the system, through an optional firewall 50 for enhanced security of personal and corporate data. Assuming the data traffic passes the firewall, an optional Cache and/or Proxy Server 60 handles them. The inclusion of such a server or servers is optional and can serve further enhancing data security in a mode analogous to secure browsing by isolating an Application Server 70 and the data stored in a Database 80 so that a potential unauthorized intruder can access and modify only a copy of these data and not the original sensitive data. It can also serve as a faster means of accessing commonly used data that may be dispersed to a number of servers and databases as opposed to a single server 70 and database 80.

It is obvious to a reader of ordinary skill in related art, that additional devices, apparatuses, subsystems, servers, firewalls, databases and other computing components may be added, or that some of the elements of FIG. 1 may be omitted (e.g. firewall 50, Cache and/or Proxy Server 60), or that their position and connections to each other may be modified without altering the scope, usability, essence, operation, result and purpose of the present invention.

Speaker VB Verification

Figure 2:
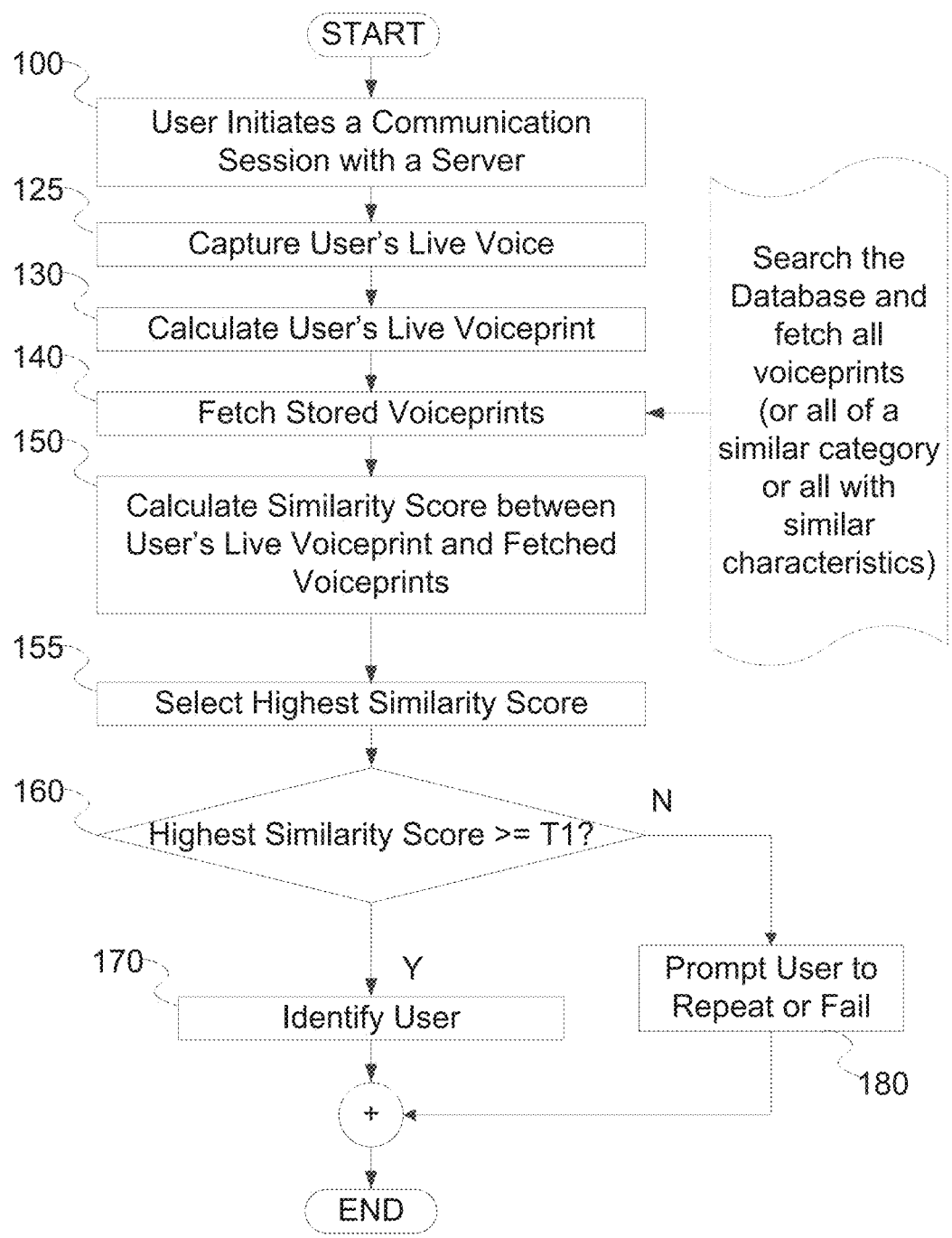
FIG. 2 shows basic speaker verification using natural speech as performed.

In an exemplary aspect, a speaker is verified based on his natural speech. FIG. 2 shows basic speaker verification using natural speech as performed in prior art. The method starts with the speaker initiating a communication session 100 with the exemplary system of FIG. 1 (or a VB server). The user may initiate a telephone session using an analogue telephone 10, a digital (Voice Over Internet Protocol (VOIP)) phone or mobile phone or smartphone 20 or tablet, laptop, or desktop computer 30. The telephone session may also be implemented as a teleconferencing—multi-party session. Alternatively, the speaker may use a software application running on his smartphone 20 or tablet, laptop, or desktop computer 30. This software application may provide VOIP telephone or teleconferencing—multi-party session, video call, video conferencing, text or voice or video chat session, e-mail session, or a combination of the preceding.

It is noted that the devices 10-30, apparatuses, subsystems and applications perform no processing other than forwarding voice signals or first digitizing voice signals, converting them into data and then forward them via any of the networks 40 shown in FIG. 1 to back-end servers 60, 70, and receiving voice signals or data representing voice signals for play back to the speaker.

Following the initiation of the communication session 100, the device chosen by the speaker captures his live voice 105. The back-end server or servers 60, 70 receive the voice data corresponding to the user's live natural speech and calculate his live voiceprint 130. A voiceprint is a set of measurable characteristics of a human voice that can be used to uniquely identify the speaker. These characteristics, which are based on the physical configuration of the speaker's mouth and throat, can be expressed as a mathematical formula or as a vector. The voiceprint can be calculated with any algorithm and contain any number of features. By means of example, the voiceprint can be calculated at a backend server by creating an i-vector (or an x-vector or other representation), i.e. a projection of a variable duration speech utterance onto a single low dimensional space, typically of a few hundred components characterizing the respective utterance. Further details regarding the use of i-vectors and/or x-vectors are described in *Front-end factor analysis for speaker verification*, IEEE Transactions on Audio, Speech, and Language Processing, Kenny et al., 19(4), 788-798 (2011) and *X-vectors: Robust DNN embeddings for speaker recognition*, 2018 IEEE International Conference on Acoustics, Speech and Signal Processing (ICASSP) (pp. 5329-5333) (April 2018), the entire contents of both of which being incorporated herein by reference.

This is followed by fetching all voiceprints corresponding to the same speaker stored 140 at the backend servers 60, 70 or at a backend database 80. The selection of voiceprints associated with this speaker are selected by using call IDentification (ID), and other similar information captured by server 70 (and/or server 60) and a lookup table. As a result the search space of speaker stored voiceprints to compare with the speaker's live voiceprint is reduced. Alongside the stored voiceprints are stored the corresponding digitized voice files (e.g. WAV, MP4, MP3, or any other sound format), user ID data, voice metadata describing the content and context of the stored digitized voice files.

A first similarity score is calculated 150 for each pair of the speaker's live voiceprint and each fetched voiceprint and the pair with the largest similarity score is selected 155 along with the corresponding similarity score. This similarity score is then compared to a predefined threshold T1 160. If this score is greater than or equal to T1, then the speaker is correctly identified 170. If not, then the speaker identification has failed and the system may, optionally, prompt the speaker to repeat 180 what he just uttered or may start a dialogue to request clarifications or additional information that can be used to correctly verify the speaker against the partially-identified speaker from the call ID and other available data.

Failure of voice recognition and/or speaker verification may be due to lack of a stored voiceprint corresponding to this particular speaker, or due to noise in the voice signal, changes in speaker's voice as a result of e.g. a sore throat, aging if the speaker has not used the user identification service for a long time, or other reasons beyond the scope of this invention. In the former case, the system cannot identify the speaker unless the speaker provides additional information beyond this used for voice biometrics. In the latter case, the repetition of the uttered speech by the speaker, or his participation in a natural speech dialogue with the system could lead to a correct identification result.

This method produces acceptable results assuming the speaker's voiceprint is among those stored at the backend servers 60, 70 and/or the database 80 and the live speaker's uttered speech has a sufficiently long duration (typically several seconds) for a useful live voiceprint to be constructed.

During the initial setup of the system, the database is populated with voiceprints corresponding to speaker of the system. This database population process may be repeated during the user's new interactions with the system or for new speakers-users. Manual intervention of an operator or support staff may optionally be used.

Real time operation and response times depend on the processing power of the application server 70 undertaking the processing, which in turn depends on the amount of stored voiceprints. For general purpose systems where the number of potential speakers (and consequently the corresponding stored voiceprints) is large, in the order of hundreds of thousands or millions, the delays introduced for processing all these data and verify the speaker can be beyond what users may consider acceptable. For this reason, the step of reducing the set of stored voiceprints that are used in the VB calculations is essential to reduce the stored voiceprint set against which to compare the live speakers voiceprint.

Nevertheless, the reduced stored voiceprint set may still be comprised of significantly different phonemic content as compared to that of the live voiceprint, making an effective comparison and subsequent scoring sub-optimal. To reduce the variability of phonemic content mismatch between the stored voiceprint and the live voiceprint, systems have required that the live voiceprint data is comprised of at least a minimum duration of speech, which ensures that the phonemic content of the live voiceprint will be enriched enough so as to statistically be not significantly different from the stored voiceprint phonemic content.

This requirement for a significantly long live speech sample so as to have a statistically similar phonemic distribution between the live and stored voiceprints, poses a significant usability and applicability challenge to real world applications. The required duration of live speech samples is often of the order of several words, or of particularly long utterances, which would not normally be found in an interaction between an application user and a conversational system. Thus, the applicability and usability of these systems in conversational interaction applications is severely limited.

Speaker VB Verification Using Active Words

Figure 3:
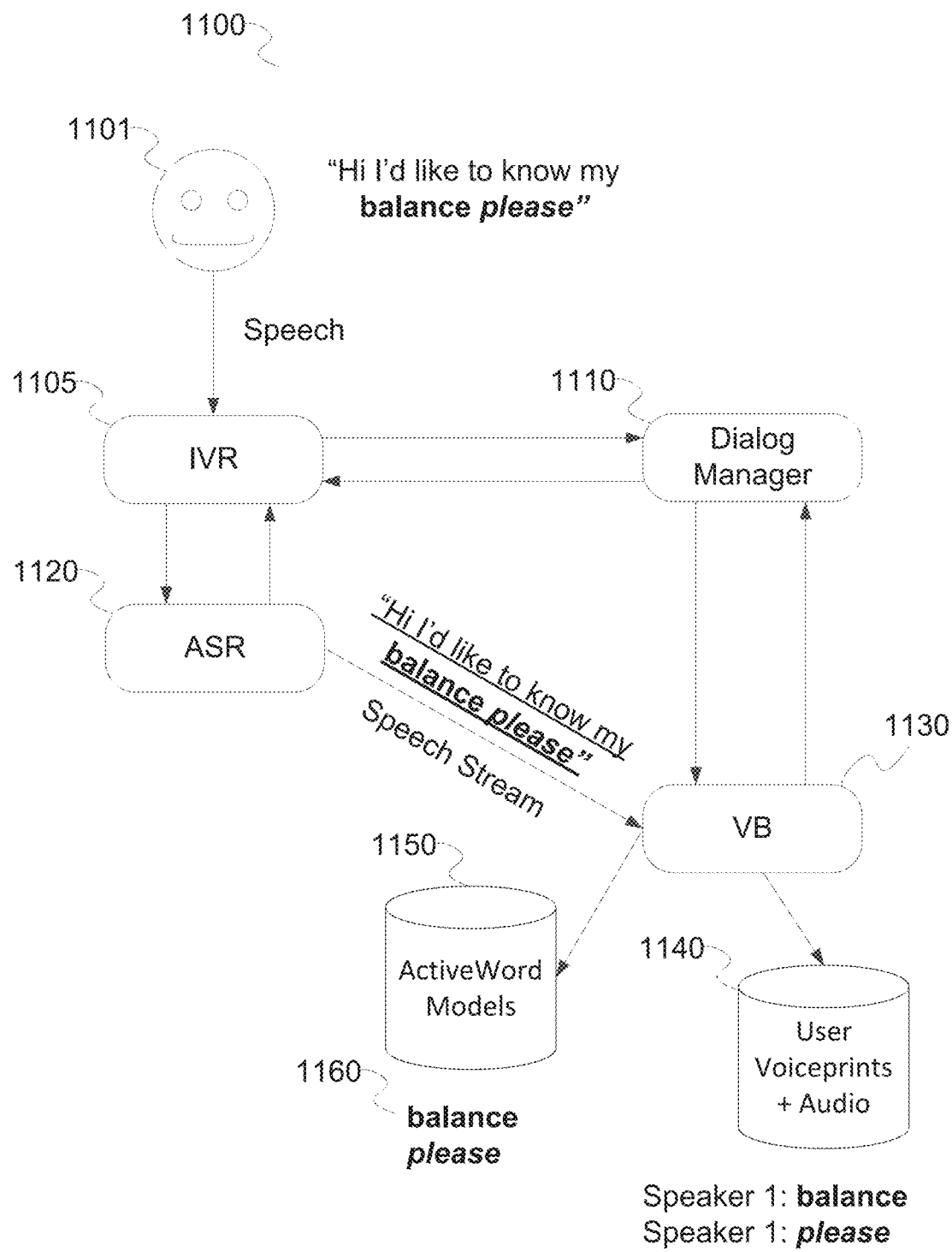
FIG. 3 shows a schematic diagram of the components and the flow of data in innovative exemplary implementation of a voice biometric system using Active Words.

FIG. 3 shows a schematic diagram of the components and the flow of data in innovative exemplary implementation of a voice biometric system using AW. The innovative Voice biometric system 1100 comprises an Interactive Voice Response (IVR) module, responsible for performing live speech conversation with a live speaker 1101, based on uttered questions and replies. The speech communication between speaker 1101 and IVR 105 is done according to what is described in FIG. 1. IVR 1105 is connected to an Automatic Speech Recognition (ASR) module 1120, which ASR 1120 analyzes uttered speech and transcribes the speech into text. IVR 1105 streams voice received from speaker 1101 to ASR 1120 together with identification data. Identification data may include, without limitation, a unique subscriber identifier such as an International mobile subscriber identity (IMSI), a mobile identification number (MIN), a mobile subscription identification number (MSID or MSIN), temporary mobile subscriber identity (TMSI), Mobile Subscriber ISDN Number (MSISDN), Mobile Station International ISDN Number, Mobile International ISDN Number, Subscriber Number (SN), and/or a Packet temporary mobile subscriber identity (P-TMSI), a unique electronic serial number (ESN), a mobile device identifier, a mobile equipment identifier (MEID), an International Mobile Equipment Identifier (IMEI), a media access control (MAC) address, Android ID, a Unique Device Identifier (UDID), Universally Unique Identifier (UUID), a Core Foundation Universally Unique Identifier (CFUUID), a globally unique identifier (GUID), an OpenUDID, a SecureUDID, an unique Identifier (UIDevice), LTE static IP address (UEIP), Tracking Area Identity (TAI), Temporary Identity Number (TIN), Globally Unique Temporary UE Identity (GUTI), advertising ID—identifierForAdvertising (IDFA), identifierForVendor (IDFV), an Android Advertising ID, Google Advertising ID, Windows Advertising ID, Apple ID (i.e., iOS App IDs), Packet Data Network Identity (PDN ID), P-GW ID, Evolved Packet System Bearer Identifier (EPS Bearer ID), E-UTRAN Radio Access Bearer Identifier (E-RAB ID), Data Radio Bearer Identifier (DRB ID), Public Land Mobile Network Identifier (PLMN ID), MME Identifier (MMEI), Globally Unique MME Identity (GUMMEI), Tracking Area Identity (TAI), Temporary Identity (TIN), SAE Temporary Mobile Subscriber Identity (S-TMSI), MME temporary mobile subscriber identity (M-TMSI), and a tunnel end point identifier (TED), C-RNTI, User Equipment Identifier (UEID), an email address, an IP address, a Mobile IP address, a username caller ID, session ID, an RFID, and any other device identifier. ASR 1120 receives the streamed speech and identification data and uses an acoustic model and optionally a language model (both stored locally at ASR 1120, or at a local database, or at the cloud) to identify phonemes, syllables, words and sentences in the speaker's 1101 speech.

The acoustic and language models used by ASR 1120 may be produced by the proposed innovative system. In some implementations, either one or both of the two models may be imported from other applications and systems, external to system 1100, where their creation involves analyzing speech files and their transcribed text content and timing information, and words, phrases, and their relationships in a given language, respectively. The models may be automatically created by system 1100 or external systems. In yet another implementation, manual intervention may be employed during the creation of the models to determine a configuration of and/or selection of parameters for a model. Speech recognition may include automatic speech recognition (ASR), computer speech recognition, and/or speech to text (STT). Speech recognition and/or voice recognition models herein may include, without limitation Hidden Markov models (HMMs), Dynamic time warping based speech recognition, a back-off model, Neural networks, Deep feedforward and recurrent neural networks, Long short-term memory (LSTM), acoustic modeling, language modeling, a Gaussian mixture model, and/or end to end automatic speech recognition.

The transcribed speech may optionally be fed to a Natural Language Understanding (NLU) unit. In one implementation, the NLU uses a Semantic Model of the used language and creates metadata that describe what the words in the transcribed text mean. For instance, the phrase "how much money did I spend at Starbucks last month" is processed by the NLU, which assigns the tag "merchant" to "starbucks" and the tag "date" to "last month". The semantic model is independent and unrelated of the current invention and its aspects and can be imported from other systems or services.

ASR 1120 continues by streaming speech, transcribed speech (i.e. text) and control data (e.g. word and/or letter and/or sentence boundaries and tags identifying word and/or letter and/or sentence boundaries in the streamed speech) to Voice Biometric module 1130, so as to allow association of the streamed (i.e. uttered) speech with its content (i.e. transcribed text). implementations, the alignment of words may be done by the ASR module 1120 or the VB module 1130.

VB 1130 receives the speech, text and control data and uses them to identify speaker 1101. To reach an identification result, VB 1130 analyzes the transcribed text and control data to deduce the content and/or context of speech (e.g. a request to get the balance of a bank account). In some configurations, VB 1130 communicates with an NLU module (not shown in FIG. 3, to receive an estimation of the context of the speech as this context is derived from the content of the transcribed speech by analyzing the natural language using a language model and rules to understand the conveyed meaning).

Using the content and/or context of the speech, VB 1130 checks a lookup table (or other data representation either locally or remotely stored) which associates a context (e.g. "I want my bank account balance please") with a set of used words (e.g. "account" and "balance") based on one ore more selection criterion. In one implementation, a selection criterion may be frequency of use. Other selection criteria may be used such as, without limitation, type of word, amount of phonemes in a word, combination of phonemes, and/or amount of syllables in a word or phrase. A selected word is referred to as an "Active Word" (AW). An AW is used by VB 1130 to improve the performance of speaker 1101 verification. This technical improvement stems from the fact that VB 1130 uses AWs to limit the search of speaker voiceprints stored in a database 1140, accessed by VB 1130, to only those speaker voiceprints that corresponds to AWs, and thus improve the phonemic content match between the live speaker voiceprint and the stored speaker voiceprints. This process of matching the phonemic content of live and stored speaker voiceprints, using active words, alleviates the requirement for long speaker samples and long utterances, and allows the VB 1130 to perform an accurate voiceprint scoring with minimal live speech samples.

This search limiting action also improves database access times as hundreds or thousands of voiceprints may be stored for the same speaker, and more importantly significantly reduces the processing needs to compare the live speaker's speech voiceprint (computed by VB 1130 in real time) with the voiceprints in database 1140. As a result the number of comparisons is reduced from a scale of hundreds or thousands of comparisons to merely a few dozens or even less comparisons.

These voiceprints may, in some implementations, be stored together with metadata describing their content and/or context. These metadata may be created using speech recognition and natural language understanding analysis, as well as speaker intent analysis. They may also be captured by analyzing speaker interaction with the system, or use of an application running at a user or speaker's computing device 20 or30 which may provide a multimodal (voice, text, graphics, video, chat, email) user interface, while enabling all voice processing at the application server 70.

Each of the stored voiceprints may correspond to a word, phrase, or paragraphs uttered by a user at an earlier session with the system. For instance, "my name is John" creates a different voiceprint from "thank you". This is not only due to the different words in these two phrases but also due to the different phonemes, and their combinations, leading to different intonations and linking between them, and so on. These characteristics may have an effect on the number of correct user identification results and failures, especially in the presence of noise. For instance, if the live user's voiceprint has a different context (e.g. is derived from different words or phonemes) than the stored voiceprints selected according to the pre-identification result then the live and the stored voiceprints may not be similar enough to correctly identify the user and lead to a failure or false negative result.

The choice of the amount of AWs can be based on their frequency of occurrence and on AW models generated by VB 1130 and stored in an AW database 1160. These AW models may be created as an average model from the recorded speech of all or a subset of the speakers of system 1100, i.e., a user or speaker population. Example active words may include "balance", "account" and "please" 1160. In this example, two active words are defined for the selected context. VB 1130 could have selected more AWs or even a single AW. The choice of the number of AWs may be based on performance metrics (e.g. accuracy of result, time to compute, etc.) or a selection by the system administrator and may be structured to reflect first the frequency distribution of the words in a collection of different speakers' speech, or of the same speaker 1101 in past uses of the system for the same context. Second, to reflect the possibility that in the presence of noise, or strange accent and intonation of the speaker 1101 (e.g. when the speaker has a sore throat) some of the uttered words may be erroneously transcribed, so using a larger set of AWs will contain at least one of the words uttered by the speaker and correctly transcribed by ASR 1120. A balance between the size of the set of AWs and VB 1130 performance may be calculated in real time by VB 1130, which may periodically adjust the size of the AW set for speaker 1101 and for the specific context in consideration. In some configurations, a system administrator may define the size of the AW sets.

VB 1130 compares the live user's speech voiceprint with the AW speaker's voiceprint(s) for the detected content and/or context, stored in database 1140, and produces a first similarity score for each AW speaker's voiceprint. By means of example, comparison is done in a vector space, where both the live speaker's speech voiceprint with the selected AW speaker's voiceprint(s) are i-vectors (or x-vectors, or other representation). Also by means of example, i-vectors (or other representations) may be stored in a compact form where correlations between the coefficients in the i-vector or between the i-vector and the corresponding AW i-vector (in database 1150) are exploited, so as to significantly reduce the dimensions of the i-vectors that need to be compared with the aim to reduce processing time during real-time operation.

VB 1130 uses the first similarity scores of the comparison results and selects the stored speaker voiceprint corresponding to the highest score result, which it then compares against threshold T1 and if the first similarity score is equal or exceeds T1, then the speaker is correctly verified.

As a result, the use of AWs enables the word-by-word (or even subword-by-subword) comparison between the live user's speech and the stored (e.g. in i-vector form) user's sample for each AW, producing more accurate results at a fraction of the processing time required without AWs, and using live speech segments of very short duration. By means of example, AWs can provide accurate identification results using live speech of only a single word or of word segments (e.g. syllables or phoneme combinations) which is very useful in situations when the speaker is very "stingy" with his speech conversation with system 1100 or when segments of his uttered speech are corrupted beyond ASR 1120 recognition due to noise or other reasons related to the speaker or to external influences.

System 1100 is managed by a Dialogue Manager (DM) module 1110 which controls the operation of all other modules 1105, 1120, 1130, 1150. DM 1110 is controlled by an application developer or system administrator and exchanges control data with the other system components. DM 1110 controls the operation of IVR 1105 to start and perform a dialogue with speaker 1101 in order to get his request to be serviced by system 1100 (e.g. to provide the speaker with the balance of his bank account), or to request further information (e.g. which account, credit or savings account), or to prompt the speaker to get more speech input in cases where an accurate speaker identification or verification is not possible using the already uttered speech by the speaker (e.g. very noisy sample, truncated, etc.). Communication between IVR 1105 and DM 1110 may be done using any publicly available or proprietary protocol.

DM module 1110 also communicates with VB module 1130 to initiate and control a VB session using the streamed and transcribed speech and identification data received at VB module 1130 from ASR module 1120. By means of example, VB 1130 signals DM 1110 that speaker identification is not possible with high accuracy using the available live speech specimen. DM 1110 may then instruct VB 1130 to store the initial speech, text and identification data and initiate a second round of identification, also involving IVR 1105 to get better scoring that will increase the accuracy of user identification. If identification is achieved, the result is signaled by VB 1130 to DM 1110 and DM 1110 signals all system modules to end current session. DM 1110 may then output the identification result to external systems (not shown in FIG. 3).

The efficient operation of the system and the improvements brought by the use of AWs and pre-identification information allow in an exemplary scenario of use to verify a user who calls the system from his fixed-line or from his smartphone and utters only the phrase "account balance" if he has a single account with the bank he is call at, or "balance" if he has only one account and not credit etc. cards with the same bank. In other words the proposed innovative method and system are able to verify the user's identity and then service his request using the pre-identification information, the derived context of the speech session and a live speech sample of minimal duration (even as low as 1 second or even less).

Speaker Enrollment with VB System Using AW

A speaker calls into system 1100 listens to a first speech prompt from IVR 1105, and speaks a first utterance.

DM 1110 receives identification data (e.g. Automatic Number Identification Data (ANI), caller ID, or MAC address, or other) from IVR 1105 and partially identifies (pre-identifies) the speaker from the identification information. The speaker cannot be fully identified by the identification information provided by IVR 1105 because a device, calling number, etc. can be associated with or used by more than one speaker (e.g. a phone number is used by a family, or a smart phone of a user may be used by a third person either under the owner's consent or without it).

DM 1110 contacts and instructs VB 1130 to perform a lookup for an existing voiceprint referenced by the identification information, i.e. a voiceprint associated with the identification information.

If the voiceprint does not exist, VB 1130 initializes a new (empty) voiceprint, receives the utterance transcription from ASR 1120, identifies any AW occurrences, extracts and stores in database 1140 the audio corresponding to the AW, creates in database 1160 an AW model for the speaker for each detected AW, stores alongside the AW model the speech samples corresponding to the detected AW for use in the system's AW models, and returns back to DM 1110 a control message (e.g. voiceprint_does_not_exist).

DM 1110 instructs IVR 1105 to play a next speech prompt to the speaker. The speaker, in response, speaks a second utterance, and his speech is streamed by IVR 1105 to ASR 1120. ASR 1120 then relays the streamed speech to VB 1130. In a variation of the present exemplary implementation, the streamed speech is sent by IVR 1105 to DM 1110, and it is DM 1110 that relays the streamed speech to VB 1130.

ASR 1120 produces a transcription of the second utterance, which is sent to VB 1130.

VB 1130 evaluates the suitability of the speech sample for the creation of the voiceprint.

If the sample quality is not good (e.g. one or more quality metric is below a corresponding threshold), the sample is discarded and a "bad_sample" response is returned by VB 1130 to DM 1110.

If the sample quality is good, VB 1130 identifies any AW occurrences, extracts and stores in database 1140 the audio corresponding to the AW, updates in database 1160 an AW model for the speaker for each detected AW, stores alongside the AW model the speech samples corresponding to the detected AW for use in the system's AW models, and also stores the AW speech samples (that have been segmented and isolated from the speaker's speech using alignment of the speech with the transcribed text used to detect the AW) in database 1140.

The process is repeated until enough samples are stored in database 1140 so as to create a voiceprint for each AW, and a voiceprint is created for each AW. The collection of enough samples to create the speaker voiceprint for all AWs may be done during a single speaker interaction with IVR 1105, or during several interactions. However, speaker voice biometric verification cannot be performed until (at least one) speaker voiceprint for an AW has been saved in database 1140. So, until this voiceprint(s) can be stored, all speaker interactions with IVR 1105 need to involve other types of user (full not partial) identification than VB (e.g. key-in or utter a password).

Until a speaker voiceprint is created, his voice samples are stored to database 1140 and a "voiceprint_creation_failure_reason" (e.g. "voiceprint_creation_failure_reason=not_enough_sample") message is sent from VB 1130 to DM 1110. Upon successful creation of a speaker voiceprint for an AW, the AW voiceprint is stored in database 1140 alongside the speech AW samples (i.e. audio) that were used to created the AW voiceprint and a "voiceprint_creation_success" message is sent by VB 1130 to DM 1110.

It is noted that it is obvious to a person of ordinary skill in related art that the above steps and messages may be altered, deleted, substituted with other, and new messages and steps be added without altering the scope and/or context of the proposed innovative solution.

Speaker Verification with VB system using AW

A speaker calls in system 1100, listens to a first speech prompt from IVR 1105, and speaks a first utterance.

DM 1110 receives identification data (e.g. Automatic Number Identification Data (ANI), caller ID, or MAC address, or other) from IVR 1105 and partially identifies the speaker from the identification information. The speaker cannot be fully identified by the identification information provided by IVR 1105 because a device, calling number, etc. can be associated with or used by more than one speaker (e.g. a phone number is used by a family, or a smart phone of a user may be used by a third person either under the owner's consent or without it).

DM 1110 contacts and instructs VB 1130 to perform a lookup for an existing voiceprint referenced by the identification information, i.e. a voiceprint associated with the identification information.

In one implementation, VB 1130 returns back to DM 1110 a "voiceprint_exists" message and DM 1110 instructs IVR 1105 to play a next speech prompt to the speaker. The speaker, in response, speaks a second utterance, and his speech is streamed by IVR 1105 to ASR 1120. ASR 1120 then relays the streamed speech to VB 1130. In some implementations, the streamed speech is sent by IVR 1105 to DM 1110, and it is DM 1110 that relays the streamed speech to VB 1130.

ASR 1120 transcribes the utterance and forwards it to VB 1130 (directly or via DM 1110). VB 1130 evaluates the suitability of the speech sample for the creation of the voiceprint. If the sample quality is not good (e.g. one or more quality metric is below a corresponding threshold), the sample is discarded and a "bad sample" response is returned by VB 1130 to DM 1110.

If the sample quality is good, VB 1130 identifies any AW occurrences, extracts and stores in database 1140 the audio corresponding to each AW, updates in database 1160 an AW model for the speaker for each detected AW, stores alongside the AW model the speech samples corresponding to the detected AW for use in the system's AW models, and also stores the AW speech samples (that have been segmented and isolated from the user's speech using alignment of the speech with the transcribed text used to detect the AW) in database 1140.

The process is repeated until enough samples are stored in database 1140 so as to create a voiceprint for each AW, and a voiceprint is created for each AW. The collection of enough samples to create the speaker voiceprint for all AWs may be done during a single speaker interaction with IVR 1105, or during several interactions. However, voice biometric verification cannot be performed until (at least one) speaker voiceprint for an AW has been saved in database 1140. So, until this voiceprint(s) can be stored, all speaker interactions with IVR 1105 need to involve other types of speaker (full not partial) identification than VB (e.g. key-in or utter a password).

Until a user voiceprint is created, the speaker's voice samples are stored to database 1140 and a "voiceprint_creation_failure_reason" (e.g. "voiceprint_verification_scoring_failure_reason=need_more_ActiveWords") message is sent from VB 1130 to DM 1110. Upon successful creation of a speaker voiceprint for an AW, the AW voiceprint is stored in database 1140 alongside the speech AW samples (i.e. audio) that were used to created the AW voiceprint and a "voiceprint_creation_success" message is sent by VB 1130 to DM 1110.

Once one or more voiceprints are created and associated with one or more AWs for the user, System 1100 may subsequently perform Voice recognitions and/or speaker verifications by comparing voiceprints of captured AWs during a user call with stored user-specific voiceprints associated with AWs. In some implementations, the voiceprints may be created using a model that creates i-vectors (or x-vectors or other representation). As previously discussed, VB 1130 may compare the live user's speech voiceprint with the stored AW speaker's voiceprint(s) for the detected content stored in database 1140 and/or 460, and produce a first similarity score for each voiceprint associated with the user. For example, VB 1130 may perform comparisons in a vector space, where both the detected live speaker's or user's speech voiceprint with the selected AW speaker's voiceprint(s) are first converted into an i-vector (or x-vector, or other representation). Then, i-vectors (or other representations) may be stored in a compact form where correlations between the coefficients in the i-vector or between the i-vector and the corresponding AW i-vector (in database 1150) are exploited, so as to significantly reduce the dimensions of the i-vectors that need to be compared with the aim to reduce processing time during real-time operation.

VB 1130 uses the first similarity scores of the comparison results and selects a stored speaker voiceprint corresponding to the highest score result, which it then compares against threshold T1 and if the first similarity score is equal or exceeds T1, then the speaker is correctly verified.

As previously discussed, other speech and/or voice recognition models may be employed by VB 1130 to determine similarity scores based on comparing a voiceprint from detected live AW with a stored voiceprint associated with an AW of a user.

In another implementation, a single uttered speech is used to identify the speaker and no second or subsequent uttered speech segments are needed.

It is noted that it is obvious to a person of ordinary skill in related art that the above steps and messages may be altered, deleted, substituted with other, and new messages and steps be added without altering the scope and/or context of the proposed innovative solution.

Voiceprint Creation and Storage

Figure 4A:
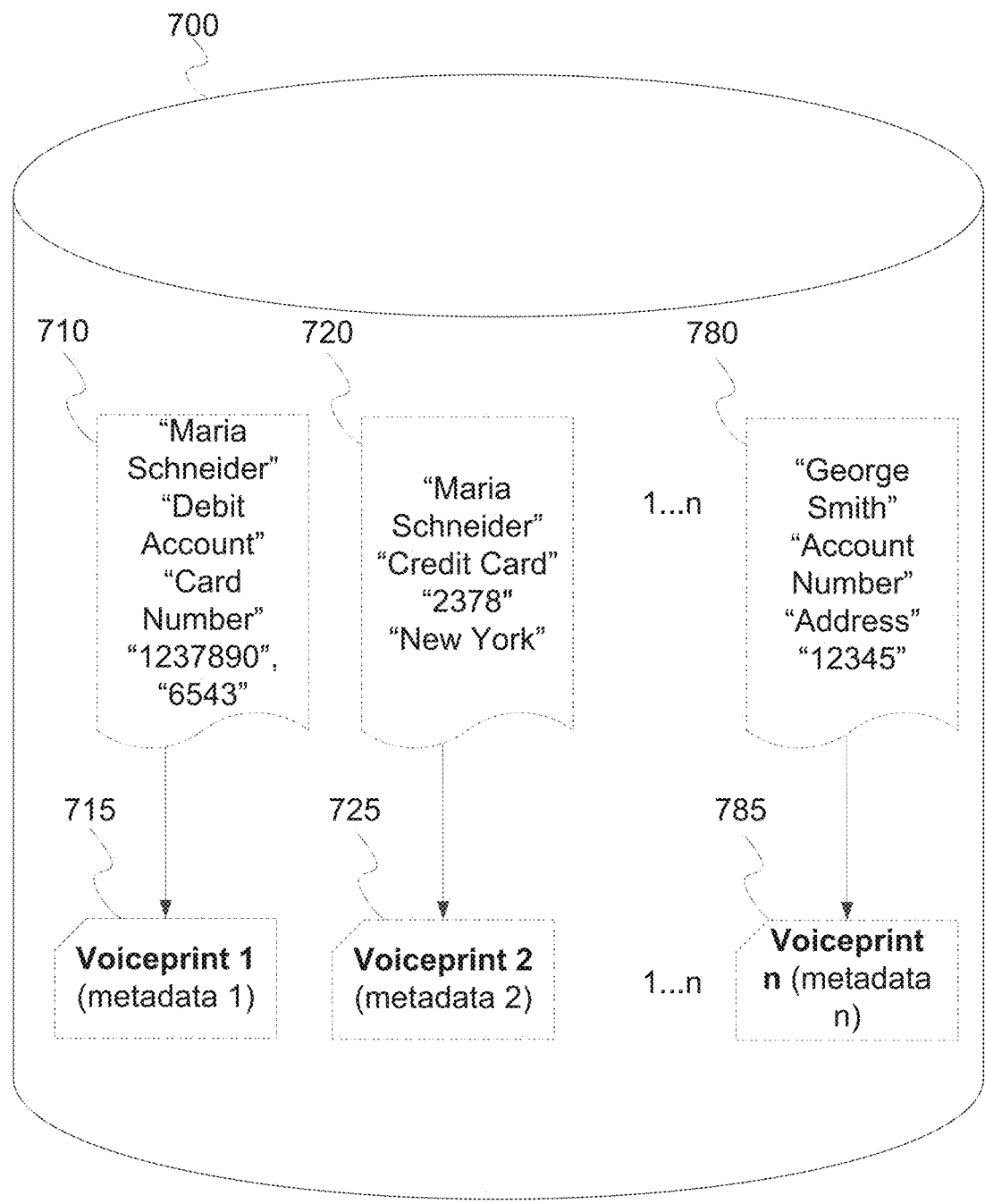
FIG. 4A shows a first example of a database storing speaker voiceprint and related information.

FIG. 4A shows a first example of a database storing speaker voiceprint and related information. The database 700 stores entries corresponding to speakers of the speaker identification service. By means of example, we consider a database storing data related to a banking application. A first speaker entry 710, corresponding to a first speaker, which entry may comprise random speech (e.g. speaker name, debit account, and card number. These are stored as audio files (e.g. WAV, MP4, MP3, and the like) that were uttered by the first speaker ("Maria Schneider", "Debit Account", "Card Number", "1237890", "6543"). The first speaker entry is also associated with a stored Voiceprint 1 715 and metadata describing the content and context of the voiceprint or other information associated with the first speaker. In existing systems, the content of the speech may be either random speech, requiring text-independent voice biometrics or passphrase-specific (e.g., "my voice is my password"), requiring text-dependent voice biometrics. The present disclosure describes systems and methods that advantageous enable voice recognition and/or speaker recognition by applying voice biometrics to words that a user is likely to use, e.g., active words, depending on the context of the user's interaction with a system or service. In this way, the processing power and memory of the system is substantially reduced with respect to text-independent voice biometric systems, while user acceptance is substantially increased with respect to text-dependent voice biometric systems because users are no longer required to recite the same phrase each time they access the system or service.

Database 700 also contains an $n^{th}$ speaker entry 780, corresponding to an $n^{th}$ speaker, which entry may comprise speaker name, account number, and address. These are stored as audio files (e.g. WAV, MP4, MP3, and the like) that were uttered by the $n^{th}$ user ("George Smith", "Account Number", "Address", "123454"). The first speaker entry is also associated with a stored Voiceprint n 785 and metadata describing the content and context of the voiceprint or other information associated with the first speaker.

Database 700 may also contain a second speaker entry 720 corresponding to the first speaker, which entry may comprise speaker name, credit card, and home city. These are stored as audio files (e.g. WAV, MP4, MP3, and the like) that were uttered by the first speaker ("Maria Schneider", "Credit Card", "2378", "New York"). The second speaker entry is also associated with a stored voiceprint 2 725 and metadata describing the content and context of the voiceprint or other information associated with the first speaker. Additional entries (and associated voiceprints and metadata) may exist for any of the users where each corresponds to different content (i.e. different uttered words and phrases) and context (i.e. different meaning of the word pair "New York" as part of an address and as part of the name "New York Commercial Bank").

In some implementations, a user and/or speaker may be asked to utter a specific passphrase (e.g. "my voice is my password . . . "). Other speakers are also asked to utter the same passphrase. Database 700 contains entries for all speakers, where these entries correspond to the same passphrase. Voiceprints are created and stored for each speaker uttering the same passphrase, together with metadata describing the content and context of the voiceprint or other information associated with the first speaker.

Voiceprint Creation and Storage with AW

Figure 4B:
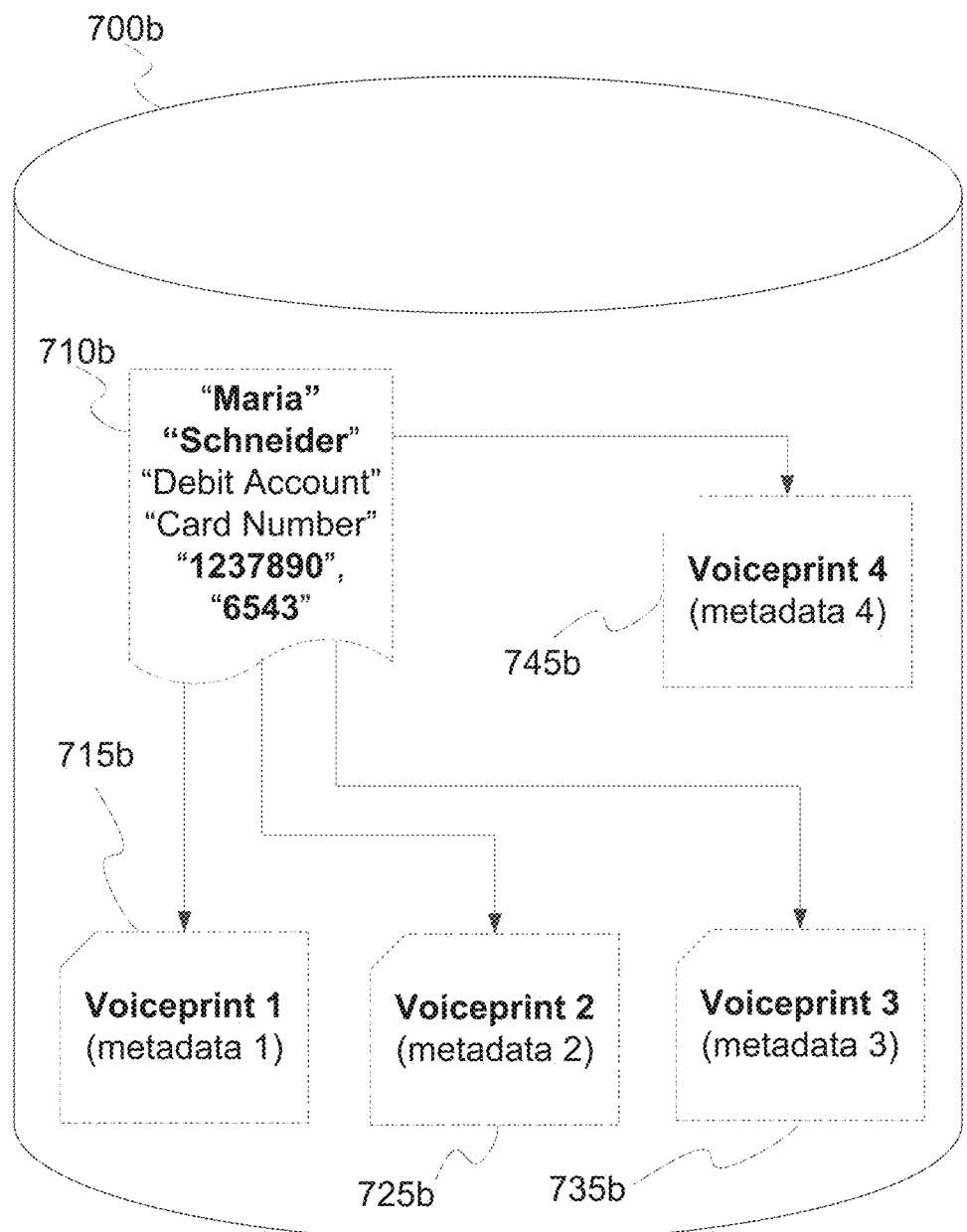
FIG. 4B shows an example of a database storing Active Words speaker voiceprint and related information.

FIG. 4B shows an example of a database storing speaker Active Words voiceprint and related information. The database 700b stores entries corresponding to speakers of the speaker identification service. By means of example, we consider a database storing data related to a particular interaction context, e.g., a banking application. A first speaker entry 710b, corresponding to a first speaker, which entry may comprise speaker name, debit account, and card number. These are stored as audio files (e.g. WAV, MP4, MP3, and the like) that were uttered by the first speaker ("Maria Schneider", "Debit Account", "Card Number", "1237890", "6543").

In one implementation, system 1100 uses historical data (e.g. word frequency used in previous speaker interactions with the system and selects "Maria", "Schneider", "1237890", and "6543" as AW1, AW2, AW3, and AW4, respectively. For each AW, system 1100 creates an associated Voiceprint 715b, 725b, 735b, 745b, where each AW Voiceprint is stored along with metadata describing the content and context of the voiceprint or other information associated with the first speaker.

Database 700 also contains speaker entries for other speakers, which entries may include speaker name, account number, and address which are stored as audio files (e.g. WAV, MP4, MP3, and the like) that were uttered by the other speakers. These entries are also associated with a stored Voiceprint and metadata describing the content and context of the voiceprint or other information associated with the associated speaker. In some implementations, the speaker may be asked to utter a specific passphrase (e.g. "my voice is my password . . . "). The same passphrase is uttered by all other speakers. All speaker utterings of the passphrase are stored in database 700 together with metadata and associated voiceprints.

Figure 4C:
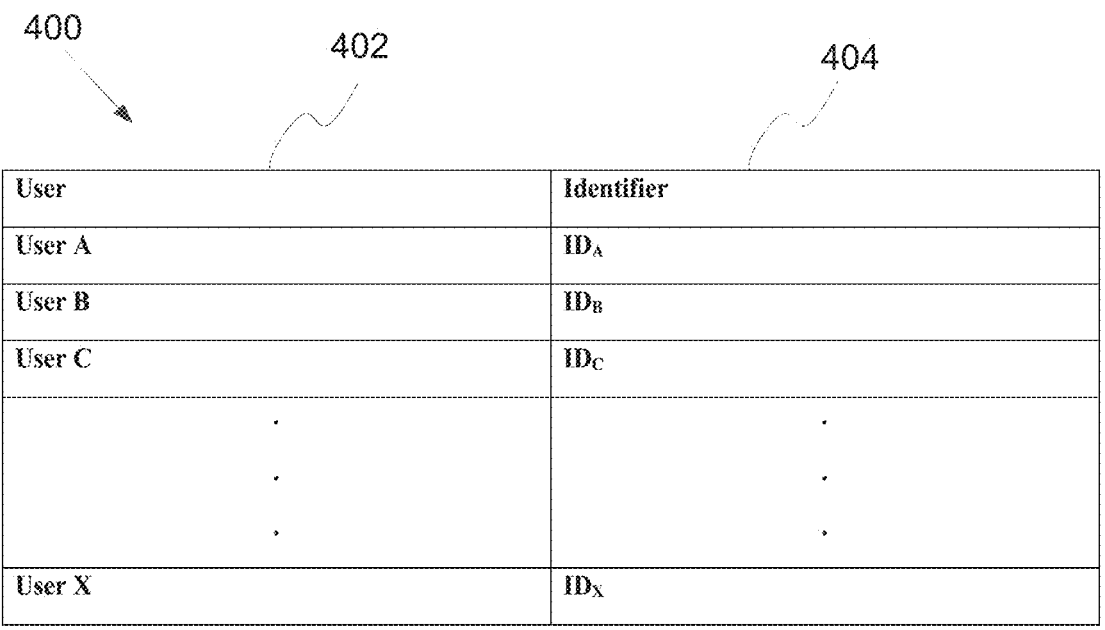
FIG. 4C illustrates a database associating users with user identifiers.

FIG. 4C illustrates a database 400 associating users with user identifiers (IDs). The database includes a column 402 having a list of known users such as User A, User B, User C, and User X among other users. The number of users may be limited only by the processing and memory capacity of, for example, System 1100. Column 404 includes user identifiers (e.g., $ID_A$, $ID_B$, $ID_C$, and $ID_X$, among others) corresponding to each user. A user ID may include one or more of the identifier information previously discussed herein. In some configurations, column 404 may include multiple IDs that correspond to a particular user.

Figure 4D:
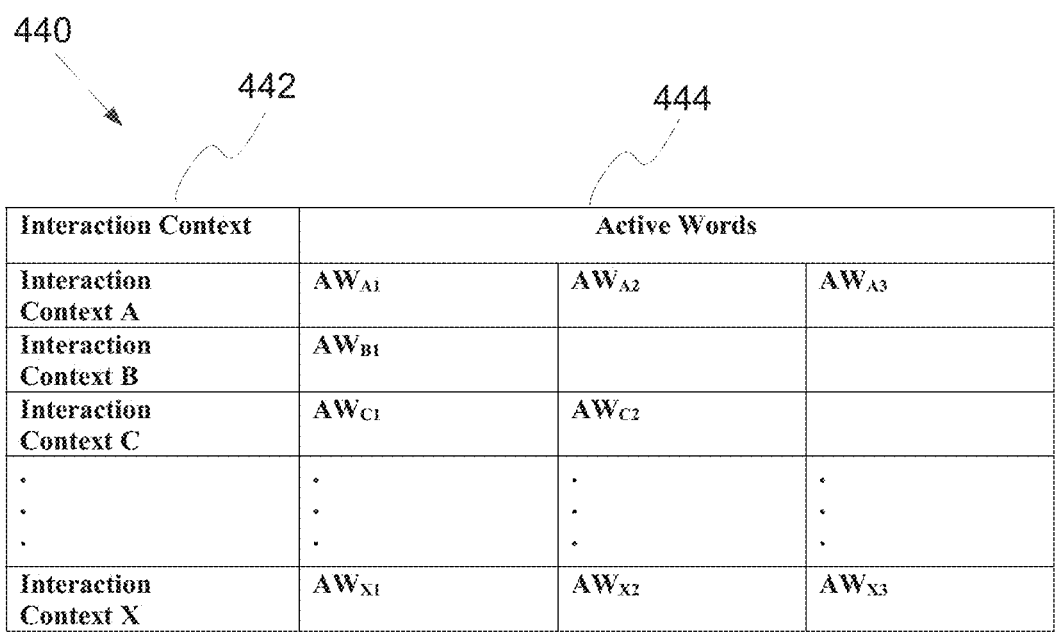
FIG. 4D illustrates a database associating active words with various user population contexts.

FIG. 4D illustrates a database 440 or datastore associating active words with various interaction contexts. Column 442 includes a list of various interaction contexts. An interaction context includes a type of interaction by a user with a system such as System 1100. For example, Interaction Context A may represent a banking application where users interface with System 1100 to enroll, access their banking account information, or initiate banking transactions via interactive voice responses with System 1100. Interaction Context B may, for example, include an insurance application that enables users to submit claims via an IVR system. Interaction Context C, other Interaction Contexts, and Interaction Context X may include a healthcare application, a frequent flyer rewards application, a utility provider application, a mobile service provider application, or any IVR based application that enables users to interface with a service or product provider. Column 444 lists groups of Active Words that are associated with a corresponding Interaction Context. For example, Interaction Context A is associated with three Active Words $AW_{A1}$, $AW_{A2}$, and $AW_{A3}$. While three Active Words are shown, any number of Active Words may be associated with an Interaction Context as previously discussed herein. As previously discussed herein, System 1100 may select AWs that are associated with a particular Interaction Context based on one or more selection criterion, which may include a frequency of use for a particular word or phrase by a population of users that interact with System 1100 via a particular Interaction Context. For example, System 1100 may gather data regarding all users during Interaction Context A, i.e., during calls to a banking application. As previously discussed, System 1100 may identify those words, subwords, or phrases most frequently spoken by all users of the user population that use the banking application. The System 1100 may designate and/or identify one or more AWs (e.g., $AW_{A1}$, $AW_{A2}$, and $AW_{A3}$) for Interaction Context A (e.g, a banking application). $AW_{A1}$ may be the word "account." $AW_{A2}$ may be the word "card." and $AW_{A3}$ may be the word "one." In a different interaction context such as Interaction Context C, e.g., an auto insurance application, $AW_{C1}$ may be the word "car" and $AW_{C2}$ may be the word "accident." System 1100 may determine that only two AWs are needed to verify a user identity using Interaction Context C.

Figure 4E:
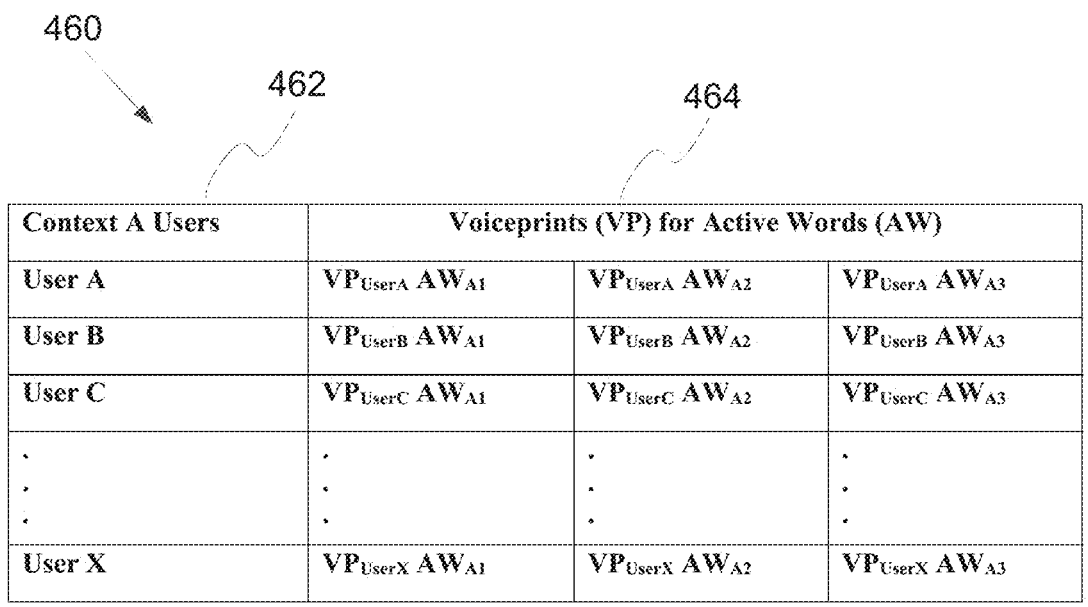
FIG. 4E illustrates a database that associates voiceprints of active words by various users for a particular interaction context associated with an IVR system.

FIG. 4E illustrates a database 460 that associates voiceprints of active words by various users for a particular interaction context associated with a IVR system. Column 462 includes a list of users while columns 464 include voiceprints of recorded AWs of corresponding users for Interaction Context A. For other Interaction Contexts, other databases like database 460 will include voiceprints of AWs of corresponding users. In some implementations, captured audio of AWs may be stored in addition to or instead storing voiceprint. In instances where only captured audio of AWs is stored, VB 1130 may generate voiceprints of stored audio of AWs in real-time or near real-time, while also generating voiceprints of detect live audio of AWs to perform speaker recognition. For example, User A has corresponding stored voiceprints $VP_{USERA}AW_{A1}$, $VP_{USERA}AW_{A2}$, and $VP_{USERA}W_{A3}$. These voiceprints may have be pre-generated based on a prior enrollment session and/or other IVR session between User A and System 1100. During a current session, ASR 1120 may detect $AW_{A1}$ in User A's speech using speech recognition of User A's conversation. VB 1130 may then process the captured audio of $AW_{A1}$ to generate a voiceprint of the captured audio of $AW_{A1}$, and compare the voice print of the captured $AW_{A1}$ with the stored voiceprint $VP_{USERA}AW_{A1}$ to perform voice recognition and confirm the identity of User A. The same approach may be applied to detected audio of $AW_{A2}$ and $AW_{A3}$. In some implementations, column 462 may include identification information associated with each User A, User B, User C, User X, and so on.

Figure 5:
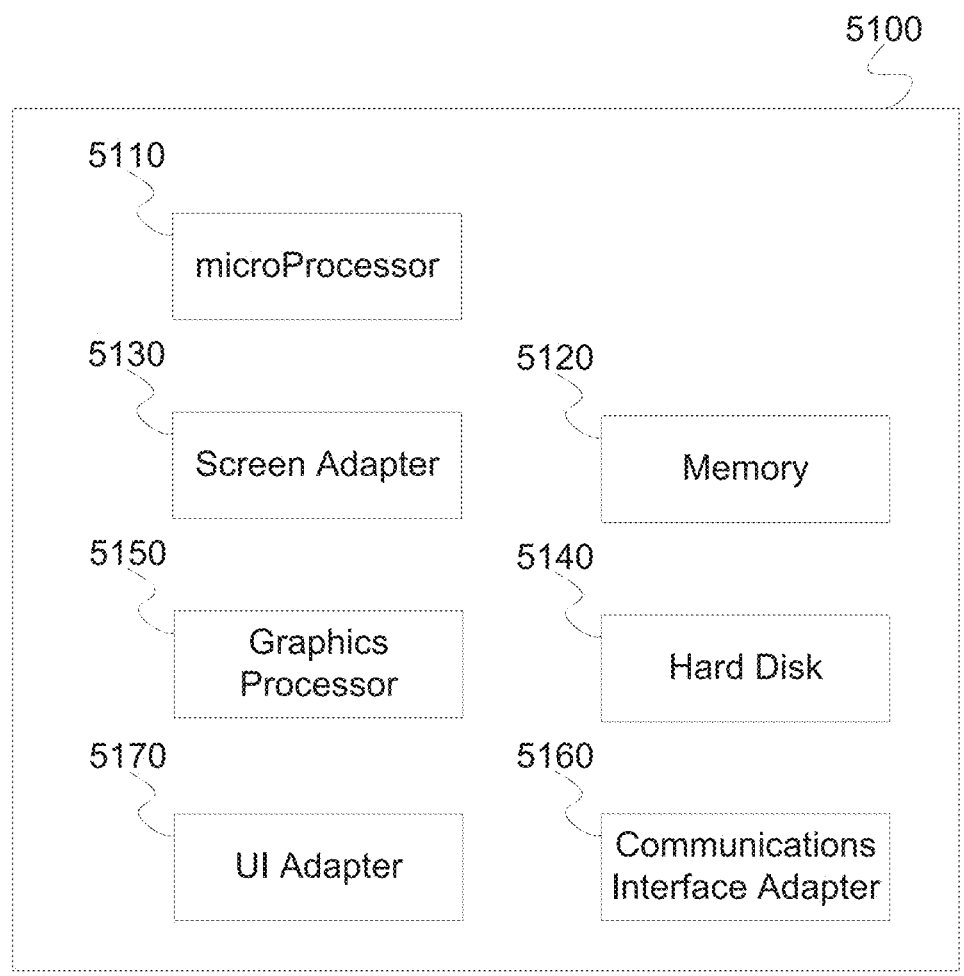
FIG. 5 shows the basic hardware architecture of an application server.

FIG. 5 shows the basic hardware architecture of an application server. Application Server 5100 comprises a microprocessor 5110, a memory 5120, a screen adapter 5130, a hard-disk 5140, a graphics processor 5150, a communications interface adapter 5160, and a UI adapter 5170. Application Server 5100 may also contain other components which are not shown in FIG. 5 or lack some of the components shown in FIG. 5.

Figure 6:
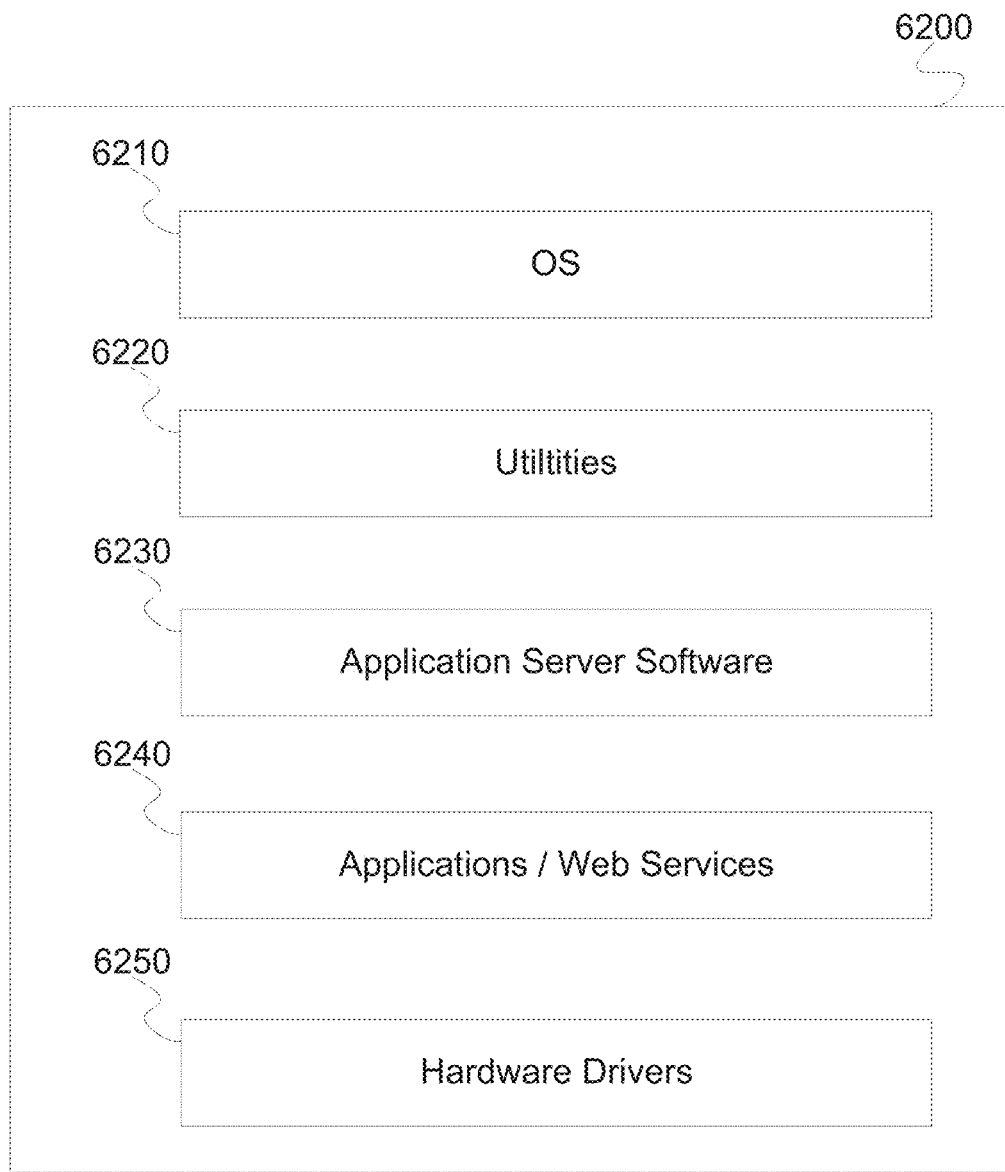
FIG. 6 shows the basic software components running on an application server.

FIG. 6 shows functional elements running on an application server 6200. The functional elements may be implemented as hardware, software, firmware, or a combination thereof. The functional elements may include an Operating System (OS) 6210, Utilities 6220, an Application Server Software 6230, at least one Application or Web Service 6240, and at least one Hardware driver 6250. Additional hardware and/or software components may run at the application server while some of those shown in FIG. 6 may be optionally not implemented.

In another exemplary implementation, the method described in FIG. 2 is modified by omitting the user pre-identification step 120. Furthermore, the Pre-identified User's Live Voiceprint Calculation step 130 is modified to calculate the user's live voiceprint (i.e. without knowledge of the user's identity), and the Fetch Pre-Identified User's Stored Voiceprints step 140 is modified to fetch all stored voiceprints (i.e. belonging to all users), or all stored voiceprints of the same category or of similar characteristics.

Additional exemplary aspects include a method for performing speaker verification including performing a speech conversation with a first user and receiving a first user identifier. The speech conversation may have an interaction context based on a subject matter of the speech conversation. The method also includes receiving a group of active words associated with the interaction context, where each active word is selected based on one or more selection criterion derived from conversations of a population of users. The method includes receiving the first user identifier and a plurality of first user voiceprints derived from pre-captured audio of the first user, where each first user voiceprint corresponds to each active word of the group of active words. The method further includes performing speech recognition of the first user audio provided during the speech conversation where the processor converts the first user audio including a plurality of captured audio elements into transcribed text including a corresponding plurality of text elements. The method also includes receiving the first user audio including the plurality of captured audio elements and the transcribed text including the plurality of corresponding text elements. The method also includes: comparing the plurality of corresponding text elements with each active word of the group of active words, identifying text elements matching each active word of the group of active words, generating a captured voiceprint for each captured audio element corresponding to each text element matching each active word, comparing each captured voiceprint corresponding to each active word of the group of active words with each first user voiceprint corresponding to each active word of the group of active words, generating a similarity score based one or more of the comparisons of each captured voiceprint with each first user voiceprint; and if the similarity score is greater than or equal to a threshold value, indicating that the first user identifier is verified or if the similarity score is less than the threshold value, indicating that the first user identifier is not verified.

A further exemplary aspect includes a system for performing speaker verification including: means for performing a speech conversation with a first user and means for receiving a first user identifier where the speech conversation having an interaction context based on a subject matter of the speech conversation; means for storing a group of active words associated with the interaction context where each active word being selected based on one or more selection criterion derived from conversations of a population of users; means for storing the first user identifier and a plurality of first user voiceprints derived from pre-captured audio of the first user where each first user voiceprint corresponding to each active word of the group of active words; means for performing speech recognition of the first user audio provided during the speech conversation where the processor converts the first user audio including a plurality of captured audio elements into transcribed text including a corresponding plurality of text elements; means for receiving the first user audio including the plurality of captured audio elements and the transcribed text including the plurality of corresponding text elements; means for comparing the plurality of corresponding text elements with each active word of the group of active words; means for identifying text elements matching each active word of the group of active words; means for generating a captured voiceprint for each captured audio element corresponding to each text element matching each active word; means for comparing each captured voiceprint corresponding to each active word of the group of active words with each first user voiceprint corresponding to each active word of the group of active words; means for generating a similarity score based one or more of the comparisons of each captured voiceprint with each first user voiceprint; and if the similarity score is greater than or equal to a threshold value, means for indicating that the first user identifier is verified or if the similarity score is less than the threshold value, mean for indicating that the first user identifier is not verified.

Another exemplary aspect includes a method for verifying a speaker using natural speech including: initiating a session with one of a system or a computing device or a computer apparatus or a telephone; capturing session related data; pre-identifying the user using the session related data; capturing the user's live speech; identifying at least one frequent word in the user's speech; calculating the user's live voiceprint; retrieving at least one stored voiceprint, where the at least one stored voiceprint is associated with the user and with the at least one frequent word, and where the retrieval is characterized by the session related data and the user's pre-identification data; comparing the live voiceprint with the at least one retrieved voiceprint; and verifying the user.

A further exemplary aspect includes a system for verifying a speaker using natural speech the system including: means for initiating a session with one of a system or a computing device or a computer apparatus or a telephone; means for capturing session related data; means for pre-identifying the user using the session related data; means for capturing the user's live speech; means for identifying at least one frequent word in the user's speech; means for calculating the user's live voiceprint; means for retrieving at least one stored voiceprint, where the at least one stored voiceprint is associated with the user and with the at least one frequent word, and where the retrieval is characterized by the session related data and the user's pre-identification data; means for comparing the live voiceprint with the at least one retrieved voiceprint; and means for verifying the user.

Yet another exemplary aspect includes non-transitory computer program product that causes a system to verify a speaker using natural speech, the non-transitory computer program product having instructions to: initiate a session with one of a system or a computing device or a computer apparatus or a telephone; capture session related data; pre-identify the user using the session related data; capture the user's live speech; identify at least one frequent word in the user's speech; calculate the user's live voiceprint; retrieve at least one stored voiceprint, where the at least one stored voiceprint is associated with the user and with the at least one frequent word, and where the retrieval is characterized by the session related data and the user's pre-identification data; compare the live voiceprint with the at least one retrieved voiceprint; and verify the user.

The above exemplary implementations are intended for use either as a standalone user voice biometric identification method in any conceivable scientific and business domain, or as part of other scientific and business methods, processes and systems.

The above exemplary descriptions are simplified and may not include certain hardware and software elements that may be used in the implementations because they may not be part of an inventive concept, are not needed for the understanding of the implementations, and are within the common general knowledge of a person of ordinary skill in the art. Furthermore, variations of the described method, system architecture, and software architecture are possible, where, for instance, method steps, and hardware and software elements may be rearranged, omitted, or newly added.

Various aspects of the invention are described above in the Detailed Description. While these descriptions directly describe the above aspects, it is understood that those skilled in the art may conceive modifications and/or variations to the specific aspects shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of various exemplary aspects of the application has been presented and is intended for the purposes of illustration and description. It is not intended to be exhaustive or limit the invention to the precise form disclosed and many modifications and variations are possible in the light of the above teachings. The exemplary aspects were chosen and described to explain the principles of the invention and its practical application and to enable others skilled in the art to best utilize the inventions in various aspects and with various modifications as are suited to the particular use contemplated. Therefore, it is intended that the inventions not be limited to the particular implementations disclosed herein for carrying out the inventions, but that the inventions will include all aspects falling within the scope of the appended claims.

In one or more exemplary aspects, the functions described may be implemented in hardware, software, firmware, or any combination thereof. If implemented in software, the functions may be stored on in a non-transitory manner or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Such storage mediums and/or databases on them may be referred to as datastores. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosed exemplary aspects is provided to enable any person skilled in the art to make or use the present invention. Various modifications to these exemplary aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the principles and novel features disclosed herein.

What is claimed is:

1. A system for performing speaker verification comprising one or more servers, wherein at least one server comprises a processor and non-transitory computer-readable media comprising processor-executable instructions for:
an interactive voice recognition (IVR) module of the one or more servers configured to perform a speech conversation with a first user through a client device;
a datastore module communicatively coupled to storage media, configured to:
store groups of active words, wherein each group of active words includes active words associated with a corresponding interaction context; and
store a first user identifier associated with the first user and a plurality of first user voiceprints derived from pre-captured audio of the first user, each first user voiceprint of the plurality corresponding to an active word in one or more group of active words;
an automated speech recognition (ASR) module of the one or more servers configured to:
transcribe voice audio from the speech conversation streamed by the IVR into transcribed text, wherein the transcribed text includes a plurality of text elements, each element corresponding to a captured audio element of the streamed voice audio; and
generate a plurality of control data, each control datum associating one or more text elements of the plurality of text elements with the corresponding captured audio element; and
a voice biometric (VB) module of the one or more servers configured to:
receive, from the ASR module, the plurality of captured audio elements, the transcribed text including the plurality of corresponding text elements, and the control data;
estimate a first interaction context from the plurality of text elements, the transcribed text, or both;
retrieve, from the datastore module, a first group of active words associated with the first interaction context;
receive the first user identifier;
identify text elements matching each active word of the first group of active words, and generate, using the control data, a captured voiceprint for each identified text element from the corresponding captured audio element;
retrieve, from the datastore module, a plurality of first user voiceprints, wherein each first user voiceprint is associated with an active word of the first interaction context and with the first user identifier;
compare each captured voiceprint associated with a respective active word with the retrieved first user voiceprints associated with the respective active word; and
verify the first user identity based on a similarity score determined by the one or more comparisons between each captured voiceprint and retrieved corresponding first user voiceprints.

2. The system of claim 1, wherein the verification of the first user based on the similarity score includes comparing the similarity score to a threshold value.

3. The system of claim 1, wherein each respective captured audio element includes at least one element selected from the group of a phoneme, syllable, word, subword, and phrase and the corresponding text element includes the at least one element.

4. The system of claim 1, wherein transcribing voice audio includes at least one speech recognition model selected from the group of vector analyses, Hidden Markov models (HMMs), Dynamic time warping based speech recognition, a back-off model, Neural networks, Deep feedforward and recurrent neural networks, Long short-term memory (LSTM), acoustic modeling, language modeling, a Gaussian mixture model, and end to end automatic speech recognition.

5. The system of claim 1, wherein the one or more of the comparisons of each captured voiceprint with each retrieved first user voiceprint includes at least one voice recognition model selected from the group of vector analyses, Hidden Markov models (HMIs), Dynamic time warping based speech recognition, a back-off model, Neural networks, Deep feedforward and recurrent neural networks, Long short-term memory (LSTM), acoustic modeling, language modeling, a Gaussian mixture model, and end to end automatic speech recognition.

6. The system of claim 1, wherein each interaction context of a plurality of interaction contexts includes a type of interaction that the first user has with the IVR module.

7. The system of claim 6, wherein the plurality of interaction contexts includes any one or more of a banking application interaction context, a healthcare application interaction context, a frequent flyer rewards application interaction context, a utility provider application interaction context, a mobile service provider application interaction context, or any interaction context associated with an IVR-based application that enables users to interface with a service or product provider.

8. The system of claim 1, wherein each active word is selected into a group of active words based on conversations of a population of users in the corresponding interaction context.

9. The system of claim 8, wherein the selection is based, at least, on one selected criterion from the group of frequency of use, type of word, amount of phonemes in a word, combination of phonemes, and amount of syllables in a word or phrase.

10. An automated method for performing speaker verification in an interactive voice recognition (IVR) system, the method comprising:
performing a speech conversation with a first user in a user session of a first interactive application, the speech conversation having an interaction context based on a subject matter of the first interactive application;
generating a first user identifier based on the speech conversation;
receiving a group of active words associated with the interaction context, wherein each active word is associated with the interaction context based on one or more selection criteria applied to conversations of a population of users in the interaction context;
receiving a plurality of first user voiceprints derived from pre-captured audio of the first user, each first user voiceprint corresponding to a respective active word of the group of active words;
converting, using speech recognition of the first user audio provided during the speech conversation, the first user audio including a plurality of captured audio elements into transcribed text including a corresponding plurality of text elements;
comparing each respective text element of the plurality of text elements with each active word of the group of active words to identify matched active words;
generating a respective captured voiceprint for each captured audio element corresponding to a respective text element identified as matching a respective active word;
comparing each respective captured voiceprint with each first user voiceprint corresponding to the respective active word of the group of active words; and
verifying the first user identifier by generating a similarity score based on the comparisons, and comparing the similarity score to a threshold value.

11. The method of claim 10, wherein generating the first user identifier includes transcribing a text element including personal data associated with the first user.

12. The method of claim 10, the method comprising performing a second speech conversation with the first user in a second user session of a second interactive application, the speech conversation having a second interaction context.

13. A non-transitory computer-readable medium comprising instructions that, when interpreted by a processor of an application server, causes the processor to:
perform, in a user session, a speech conversation with a first user, wherein the first user employs a client device that communicates with a communication interface of the application server;
receive a first user identifier based on the speech conversation, the communication interface, the client device, or any combination thereof;
transcribe voice audio from the speech conversation into transcribed text, wherein the voice audio comprises a plurality of audio elements, the transcribed text includes a plurality of text elements, and at least one audio element of the plurality of audio elements corresponds to one text element of the plurality of text elements;
estimate, based on the plurality of text elements, an interaction context;
request, from a datastore, voice verification data including a plurality of voiceprints associated with the interaction context and the first user, using the interaction context and the first user identifier;
generate a captured voiceprint for each audio element of the plurality of audio elements;
generate a similarity score for at least one captured voiceprint based on a comparison with at least one voiceprint of the plurality voiceprints of the voice verification data, to form a plurality of similarity scores; and
verify a first user identity based on a comparison between the plurality of similarity scores and a similarity score threshold.

14. The computer-readable medium of claim 13, wherein the voice verification data includes a group of action words associated with the interaction context, each voiceprint of the voice verification data is associated with a respective action word of the group of action words, and wherein generating a similarity score for the at least one captured voiceprint includes:
identifying a respective text element that corresponds to the at least one captured voiceprint;
identifying a respective action word corresponding to the text element;
identifying respective voiceprints of the voice verification data corresponding to the respective action word; and
generating similarity scores based on a comparison between the at least one captured voiceprint and the respective voiceprints corresponding to the respecting action word.

15. The computer-readable medium of claim 13, wherein an audio element or the text element or both includes at least one selected from the group of a phoneme, syllable, word, subword, and phrase.

16. The computer-readable medium of claim 13, including instructions for a first interactive application employing the user session, wherein the first interactive application includes a first interaction context.

17. The computer-readable medium of claim 16, including instructions for a second interactive application employing the user session, wherein the second interactive application includes a second interaction context.

18. The computer-readable medium of claim 17, including instructions for invoking the first interactive application or the second interactive application based on the estimated interaction context.

19. The computer-readable medium of claim 16, including instructions for granting access to restricted operations of the first interactive application after the verification of the first user identity.

20. The computer-readable medium of claim 13, wherein the application server is a single server, a server in a distributed computing system, a server in a cloud computing system, a virtual computing server, or any combination thereof.

* * * * *